(12) United States Patent
Callan et al.

(10) Patent No.: US 9,594,471 B1
(45) Date of Patent: Mar. 14, 2017

(54) SYSTEM AND METHOD FOR INSERTING ADDITIONAL ICON CONTENT INTO A DISPLAY SCREEN

(71) Applicant: Sprint Communications Company L.P., Overland Park, KS (US)

(72) Inventors: Jeffrey S. Callan, Overland Park, KS (US); David K. Fultz, Raymore, MO (US); Nathan M. Schwermann, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 510 days.

(21) Appl. No.: 14/169,544

(22) Filed: Jan. 31, 2014

(51) Int. Cl.
  G06F 3/048 (2013.01)
  G06F 3/0481 (2013.01)
  G06F 9/445 (2006.01)
  G06F 7/78 (2006.01)

(52) U.S. Cl.
  CPC ........... *G06F 3/04817* (2013.01); *G06F 7/78* (2013.01); *G06F 8/61* (2013.01)

(58) Field of Classification Search
  CPC ........... G06F 8/61; G06F 7/78; G06F 3/04817
  See application file for complete search history.

(56) References Cited

U.S. PATENT DOCUMENTS

| | | | |
|---|---|---|---|
| 5,179,708 A | 1/1993 | Gyllstrom et al. | |
| 5,327,117 A | 7/1994 | Kohsaka | |
| 5,600,776 A * | 2/1997 | Johnson | G06F 9/4443 715/733 |
| 5,806,071 A * | 9/1998 | Balderrama | G06F 17/21 |
| 6,147,977 A | 11/2000 | Thro et al. | |
| 6,441,831 B1 | 8/2002 | Abramowitz et al. | |
| 6,658,409 B1 | 12/2003 | Nomura et al. | |
| 6,882,290 B2 | 4/2005 | French et al. | |
| 7,257,777 B1 | 8/2007 | Kanevsky et al. | |
| 7,409,208 B1 | 8/2008 | Clare et al. | |
| 7,552,432 B2 | 6/2009 | Aiba | |
| 7,681,134 B1 | 3/2010 | Grechishkin et al. | |

(Continued)

OTHER PUBLICATIONS

FAIPP Pre-Interview Communication dated Aug. 25, 2014, U.S. Appl. No. 13/940,251, filed Jul. 11, 2013.

(Continued)

*Primary Examiner* — William Bashore
*Assistant Examiner* — Gregory A Distefano

(57) ABSTRACT

The system comprises a mobile device comprising an application and a display screen, wherein the display screen displays a previously inserted program icon at a display screen location. The application, when executed, identifies the receipt of a virtual pre-load pack by the mobile device, compares the virtual pre-load pack template with a current display screen template, identifies that the proposed display screen location of the virtual pre-load program icon overlaps with the display screen location of a previously inserted program icon, locates and selects an unoccupied display screen location for the insertion of the virtual pre-load program icon and inserts the virtual pre-load program icon in the unoccupied display screen location on the display screen without overlapping the display of the virtual pre-load program icon with the display of the previously inserted program icon and without violating a display screen insertion priority level.

20 Claims, 10 Drawing Sheets

(56) References Cited

U.S. PATENT DOCUMENTS

| | | | |
|---|---|---|---|
| 7,788,593 | B1 | 8/2010 | Grechishkin et al. |
| 8,347,228 | B1 | 1/2013 | Kates et al. |
| 8,468,164 | B1 | 6/2013 | Paleja et al. |
| 8,577,737 | B1 | 11/2013 | Amacker et al. |
| 8,650,096 | B2 | 2/2014 | Van Buskirk et al. |
| 9,092,291 | B1 | 7/2015 | Adib et al. |
| 9,098,366 | B1 | 8/2015 | Adib et al. |
| 9,304,647 | B1 | 4/2016 | Kates et al. |
| 9,357,378 | B1 | 5/2016 | Delker et al. |
| 9,398,462 | B1 | 7/2016 | Delker et al. |
| 9,483,253 | B1 | 11/2016 | Schwermann et al. |
| 2004/0070627 | A1 | 4/2004 | Shahine et al. |
| 2004/0148598 | A1 | 7/2004 | Kita et al. |
| 2005/0060665 | A1* | 3/2005 | Rekimoto ............. G06F 9/4443 715/810 |
| 2005/0140574 | A1 | 6/2005 | Tamura |
| 2006/0168340 | A1 | 7/2006 | Heller et al. |
| 2006/0206573 | A1 | 9/2006 | Horvitz et al. |
| 2006/0235760 | A1 | 10/2006 | Sanjar et al. |
| 2006/0235842 | A1 | 10/2006 | Szekely et al. |
| 2007/0143740 | A1 | 6/2007 | Hoerentrup et al. |
| 2008/0062318 | A1 | 3/2008 | Ellis et al. |
| 2008/0160970 | A1 | 7/2008 | Srinivas Reddy et al. |
| 2008/0276182 | A1* | 11/2008 | Leow ................ H04M 1/72525 715/740 |
| 2009/0064055 | A1 | 3/2009 | Chaudhri et al. |
| 2009/0147780 | A1 | 6/2009 | Guo et al. |
| 2009/0199176 | A1 | 8/2009 | Nath et al. |
| 2009/0259974 | A1 | 10/2009 | Lin |
| 2009/0288079 | A1 | 11/2009 | Zuber et al. |
| 2010/0199184 | A1 | 8/2010 | Horowitz et al. |
| 2010/0269107 | A1 | 10/2010 | Jung et al. |
| 2010/0306702 | A1* | 12/2010 | Warner ................ G06F 3/0482 715/811 |
| 2010/0311468 | A1 | 12/2010 | Shi et al. |
| 2010/0321323 | A1* | 12/2010 | Kim ...................... G06F 3/0418 345/173 |
| 2011/0034160 | A1 | 2/2011 | Corda et al. |
| 2012/0015624 | A1* | 1/2012 | Scott .................... G06F 9/4443 455/405 |
| 2012/0054002 | A1 | 3/2012 | Rotbard et al. |
| 2012/0054022 | A1 | 3/2012 | Kosashvili |
| 2012/0072311 | A1 | 3/2012 | Khan |
| 2012/0271819 | A1 | 10/2012 | Qiu et al. |
| 2012/0272178 | A1 | 10/2012 | Oygard et al. |
| 2013/0013671 | A1 | 1/2013 | Relan et al. |
| 2013/0073400 | A1 | 3/2013 | Heath |
| 2013/0080911 | A1 | 3/2013 | Klemm |
| 2013/0218885 | A1 | 8/2013 | Satyanarayanan |
| 2013/0339833 | A1* | 12/2013 | Chen .................... G06F 17/211 715/220 |
| 2014/0068779 | A1 | 3/2014 | Tan et al. |
| 2014/0298320 | A1 | 10/2014 | Xu et al. |
| 2015/0011311 | A1 | 1/2015 | Relan et al. |
| 2015/0304506 | A1 | 10/2015 | Zhu et al. |
| 2015/0331590 | A1 | 11/2015 | Yasui |
| 2015/0363958 | A1* | 12/2015 | Zhu ...................... G06F 3/0486 715/835 |
| 2015/0370428 | A1 | 12/2015 | Chan et al. |

OTHER PUBLICATIONS

First Action Interview Office Action dated Oct. 17, 2014, U.S. Appl. No. 13/940,251, filed Jul. 11, 2013.
Notice of Allowance dated Mar. 9, 2015, U.S. Appl. No. 13/940,251, filed Jul. 11, 2013.
FAIPP Pre-Interview Communication dated Aug. 25, 2014, U.S. Appl. No. 13/940,253, filed Jul. 11, 2013.
First Action Interview Office Action dated Oct. 17, 2014, U.S. Appl. No. 13/940,253, filed Jul. 11, 2013.
Notice of Allowance dated Mar. 6, 2015, U.S. Appl. No. 13/940,253, filed Jul. 11, 2013.
FAIPP Pre-Interview Communication dated Jul. 24, 2015, U.S. Appl. No. 14/168,007, filed Jan. 30, 2014.
Final Office Action dated Jan. 28, 2016, U.S. Appl. No. 14/168,007, filed Jan. 30, 2014.
Advisory Action dated Mar. 29, 2016, U.S. Appl. No. 14/168,007, filed Jan. 30, 2014.
Office Action dated Apr. 14, 2016, U.S. Appl. No. 14/168,007, filed Jan. 30, 2014.
Office Action dated Oct. 1, 2015, U.S. Appl. No. 14/701,156, filed Apr. 30, 2015.
Final Office Action dated Feb. 8, 2016, U.S. Appl. No. 14/701,156, filed Apr. 30, 2015.
Advisory Action dated Apr. 15, 2016, U.S. Appl. No. 14/701,156, filed Apr. 30, 2015.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Mehrotra, et al., "SenSocial: a Middleware for Integrating Online Social Networks and Mobile Sensing Data Streams," ACM, Middleware '14, Dec. 8-12, 2014, Bordeaux, France.
Fultz, David K., et al., "Virtual Preloads," filed Jan. 30, 2014, U.S. Appl. No. 14/168,007.
Schwermann, Nathan M., et al., entitled, "Methods for Customization of Default Applications on a Mobile Communication Device," filed Apr. 30, 2015, U.S. Appl. No. 14/701,156.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
Office Action dated Jun. 22, 2011, U.S. Appl. No. 12/480,677, filed Jun. 8, 2009.
Final Office Action dated Dec. 14, 2011, U.S. Appl. No. 12/480,677, filed Jun. 8, 2009.
Advisory Action dated Feb. 29, 2012, U.S. Appl. No. 12/480,677, filed Jun. 8, 2009.
Notice of Allowance dated Aug. 17, 2012, U.S. Appl. No. 12/480,677, filed Jun. 8, 2009.
FAIPP Pre-Interview Communication dated Nov. 4, 2014, U.S. Appl. 13/612,819, filed Sep. 12, 2012.
Final Office Action dated Apr. 28, 2015, U.S. Appl. No. 13/612,819, filed Sep. 12, 2012.
Advisory Action dated Jul. 13, 2015, U.S. Appl. No. 13/612,819, filed Sep. 12, 2012.
Notice of Allowance dated Oct. 22, 2015, U.S. Appl. No. 13/612,819, filed Sep. 12, 2012.
Notice of Allowance dated Aug. 3, 2016, U.S. Appl. No. 14/168,007, filed Jan. 30, 2014.
Notice of Allowance dated Jun. 20, 2016, U.S. Appl. No. 14/701,156, filed Apr. 30, 2015.
Delker, Jason R., et al. "Network Access Tiered Based on Appication Launcher Installation," filed May 25, 2016, U.S. Appl. No. 15/164,530.
Habiger, Matthew, "Systems and Methods for Customized Delivery of Virtually Installed Applications," filed Aug. 9, 2016, U.S. Appl. No. 15/232,569.

* cited by examiner

SYSTEM AND METHOD FOR INSERTING ADDITIONAL ICON CONTENT INTO A DISPLAY SCREEN

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are electronic devices used for mobile voice or data communication based on network connectivity provided by base transceiver stations known as cell towers or sites. Electronic devices may obtain network connectivity through base transceiver stations to one or more service networks. Providers of service networks may transmit one or more data packs through the one or more service networks to the mobile communication devices.

SUMMARY

In an embodiment, a system for displaying non-disruptive additional content via a display screen is disclosed. The system comprises a mobile communication device comprising an application and the display screen, wherein the display screen displays at least one previously inserted program icon at a display screen location of a plurality of display screen locations. The application, when executed on the mobile communication device, identifies the receipt of a virtual pre-load pack by the mobile communication device. The virtual pre-load pack comprises at least one virtual pre-load program icon and a virtual pre-load pack template, wherein the virtual pre-load pack template provides a proposed display screen location of the plurality of display screen locations for the insertion of the at least one virtual pre-load program icon. The proposed display screen location is based on a display screen insertion priority level. The display screen insertion priority level authorizes the virtual pre-load program icon for insertion into a display screen location of the plurality of display screen locations comprising at most a predetermined level of display frequency, wherein the display frequency comprises the time that the display screen location is viewed. The application further compares the virtual pre-load pack template with a current display screen template, wherein the current display screen template provides the display screen location of the at least one previously inserted program icon. The application further identifies, based on the comparison of the virtual pre-load pack template with the current display screen template, that the proposed display screen location of the at least one virtual pre-load program icon overlaps with the display screen location of the at least one previously inserted program icon. The application further locates and selects, in response to identifying that the proposed display screen location of the at least one virtual pre-load program icon overlaps with the display screen location of the at least one previously inserted program icon, an unoccupied display screen location of the plurality of display screen locations for the insertion of the at least one virtual pre-load program icon based on the comparison of the virtual pre-load pack template with the current display screen template. The unoccupied display screen location does not overlap with the display screen location of the at least one previously inserted program icon, and the unoccupied display screen location does not violate the display screen insertion priority level. The application further inserts the at least one virtual pre-load program icon in the unoccupied display screen location on the display screen without overlapping the display of the at least one virtual pre-load program icon with the display of the at least one previously inserted program icon and without violating the display screen insertion priority level.

In an embodiment, a system for displaying non-disruptive additional content via a display screen is disclosed. The system comprises a mobile communication device comprising an application and the display screen, wherein the display screen displays at least one previously inserted program icon at a display screen location of a plurality of display screen locations. The application, when executed on the mobile communication device, identifies the receipt of a virtual pre-load pack by the mobile communication device. The virtual pre-load pack comprises at least one virtual pre-load program icon and a virtual pre-load pack template, wherein the virtual pre-load pack template provides a proposed display screen location of the plurality of display screen locations for the insertion of the at least one virtual pre-load program icon, wherein the proposed display screen location is based on a display screen insertion priority level. The display screen insertion priority level authorizes a virtual pre-load program icon for insertion into a display screen location of the plurality of display screen locations comprising at most a predetermined level of display frequency, wherein the display frequency comprises the time that the display screen location is viewed. The application further compares the virtual pre-load pack template with a current display screen template, wherein the current display screen template provides the display screen location of the at least one previously inserted program icon. The application further identifies, based on the comparison of the virtual pre-load pack template with the current display screen template, that the proposed display screen location of the at least one virtual pre-load program icon overlaps with the display screen location of the at least one previously inserted program icon. The application further identifies, based on the comparison of the virtual pre-load pack template with the current display screen template, that no display screen location of the plurality of display screen locations comprises an area at least equivalent to the proposed display screen location without overlapping with the display screen location of the at least one previously inserted program icon. The application further locates and selects an unoccupied display screen location of the plurality of display screen locations for the insertion of the at least one virtual pre-load program icon based on the comparison of the virtual pre-load pack template with the current display screen template, wherein the unoccupied display screen location comprises an area less than the area of the proposed display screen location, wherein the unoccupied display screen location does not overlap with the display screen location of the at least one previously inserted program icon, and wherein the unoccupied display screen location does not exceed the display screen insertion priority level. The application further generates, based on selecting the unoccupied display screen location, a folder configured to store the at least one virtual pre-load program icon and configured to fit within the area of the unoccupied display screen location. The application further stores the at least one virtual pre-load program icon in the folder and inserts the folder in the unoccupied display screen location on the display screen without overlapping the display of the folder with the display of the at least one previously inserted program icon and without violating the display screen insertion priority level.

In an embodiment, a system for displaying non-disruptive additional content via a display screen is disclosed. The system comprises a mobile communication device comprising an application and the display screen, wherein the display screen displays at least one previously inserted program icon at a display screen location of a plurality of display screen locations. The application, when executed on the mobile communication device, identifies the receipt of a virtual pre-load pack by the mobile communication device. The virtual pre-load pack comprises at least one virtual pre-load program icon and a virtual pre-load pack template, wherein the virtual pre-load pack template provides a proposed display screen location of the plurality of display screen locations for the insertion of the at least one virtual pre-load program icon, wherein the proposed display screen location is based on a display screen insertion priority level. The display screen insertion priority level authorizes a virtual pre-load program icon for insertion into a display screen location of the plurality of display screen locations comprising at most a predetermined level of display frequency, wherein the display frequency comprises the time that the display screen location is viewed. The application further compares the virtual pre-load pack template with a current display screen template, wherein the current display screen template provides the display screen location of the at least one previously inserted program icon. The application further identifies, based on the comparison of the virtual pre-load pack template with the current display screen template, that the proposed display screen location of the at least one virtual pre-load program icon overlaps with the display screen location of the at least one previously inserted program icon. The application further identifies, based on the comparison of the virtual pre-load pack template with the current display screen template, that no display screen location of the plurality of display screen locations comprises an area at least equivalent to the proposed display screen location without overlapping with the display screen location of the at least one previously inserted program icon. The application further calculates, in response to identifying that no display screen location of the plurality of display screen locations comprises an area at least equivalent to the proposed display screen location without overlapping with the display screen location of the at least one previously inserted program icon, one or more modifications to the display screen location of the at least one previously inserted program icon based on the comparison of the virtual pre-load pack template with the current display screen template so that an unoccupied display screen location comprising an area at least equivalent to the proposed display screen location is generated without overlapping with the display screen location of the at least one previously inserted program icon, wherein the unoccupied display screen location does not violate the display screen insertion priority level. The application further modifies the display screen location of the at least one previously inserted program icon based on the calculation of the one or more modifications creating the unoccupied display screen location on the display screen and inserts the at least one virtual pre-load program icon in the unoccupied display screen location on the display screen without overlapping the display of the at least one virtual pre-load program icon with the display of the at least one previously inserted program icon and without violating the display screen insertion priority level.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
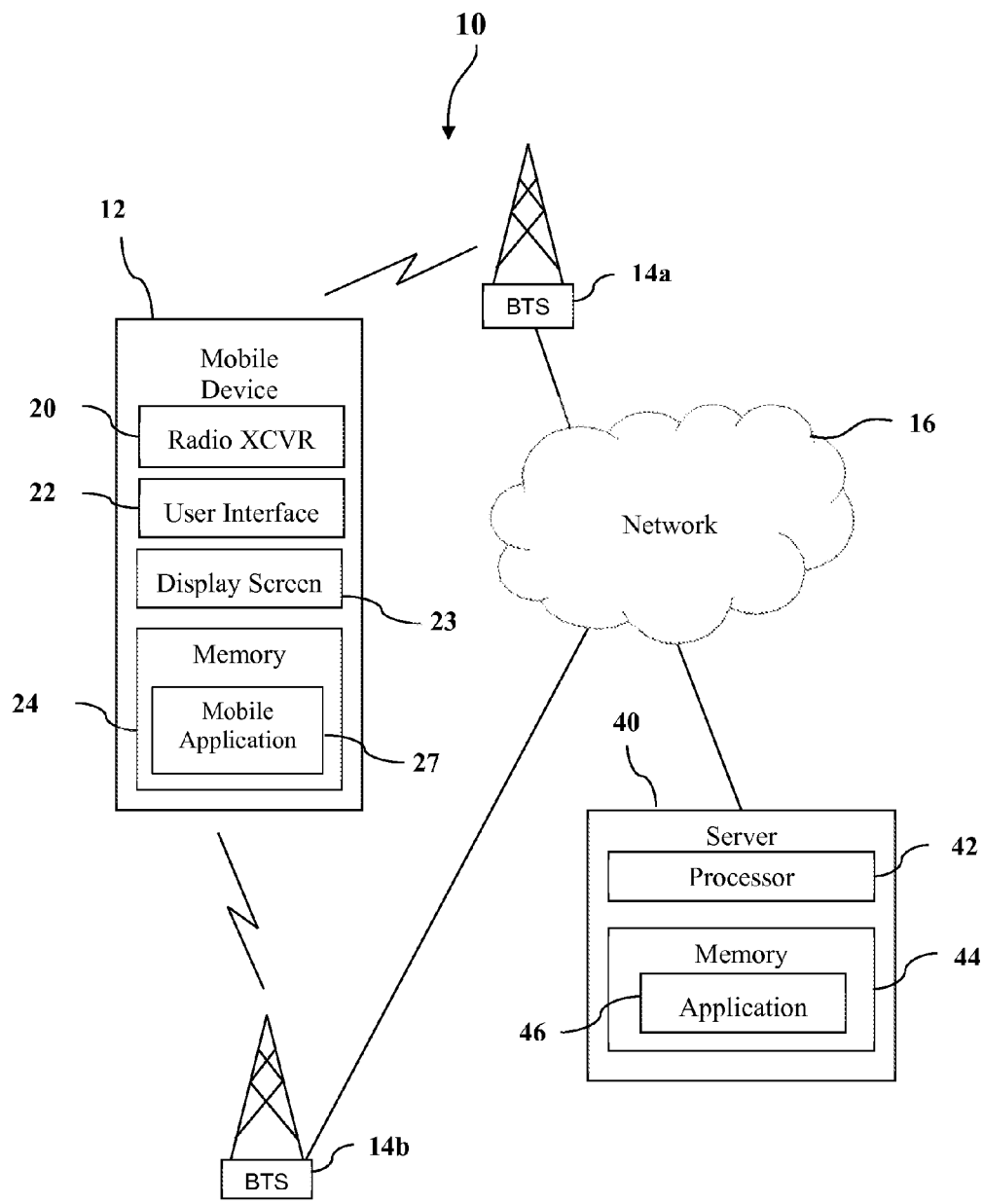
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The system and methods taught by the present disclosure are generally directed to inserting and/or installing new icons onto the display screens of a mobile communication device without disrupting the experience a user of the device has become accustomed to. For example, it may be desirable to place the new icons without moving existing icons within a screen or displacing existing icons to a different screen. Moving existing icons may irritate users and diminish customer satisfaction. As is generally understood, an icon may provide a link or reference to a function or application, such that when the icon is selected the associated function or application executes or is activated.

A mobile communication service provider may want to install additional icons on a mobile communication device to provide new virtual pre-load programs. Virtual pre-load programs are discussed further below. To avoid the disruption of the accustomed user experience, and thereby to avoid antagonizing the user of the device, the new icons are desirably placed on the display screens of the device in a non-disruptive way, for example in previously unused locations of the screens of the device. Placement of the new icons in the screens of the device may be determined by a placement algorithm or placement application. A hint for placing an icon may be provided by the sponsor or creator of the application associated with the new icons, for example identifying a particular screen and/or position within a screen. If there is no icon already placed in the hinted location, and if there is no restriction on using the location, the icon may be located by the placement application at the hinted location.

If, however, another icon is already placed in the hinted location, further analysis by the placement application is called for. If the icon located at the hinted location has never been used, the icon may be relocated to another location on the same screen, relocated to another screen, placed in the application tray, or deleted. If the icon located at the hinted location has been used, the new icon may be placed at a different location in the same hinted screen. If there is no space on the hinted screen, the new icon may be placed on a screen adjacent to the hinted screen if there is available space. In an embodiment, if there is space available on the hinted screen but the space is not contiguous, existing icons may be shifted on the same screen to make contiguous space large enough to place the new icon. In some circumstances, some blank spaces on a screen may be reserved and unavailable for placing new icons, for example an original equipment manufacturer of the mobile communication device may have reserved spaces in a screen. New icons may not be placed in these reserved spaces.

The placement application may analyze the previously configured placement of icons on screens and any constraints such as reserved spaces. The application may then analyze a pre-load package comprising a plurality of pre-load icons and pre-load applications and associated placement hints. The pre-load applications may also be associated with different priorities. The sponsors or creators of the pre-load applications may pay more or less money to obtain different placement priorities. The highest priority pre-load icons may be analyzed by the placement application for placement first, and may therefore enjoy a greater chance of being placed at their hinted location or closest to their hinted location. The next highest priority pre-load icon may be analyzed for placement next, taking account of the location already allocated for the higher priority pre-load icons. After the placement application determines the locations for all the new pre-load icons, they may be installed accordingly.

In an embodiment, the placement application may pop a dialog box to ask the user to provide guidance where to place one or more pre-load icons, for example if the placement application is unable to determine a location that does not violate one of the placement rules or criteria. Alternatively, the screens may be filled and the placement application may not be able to find any blank space whatsoever to place one or more new pre-load icons. The pop up dialog may offer the user the option of moving one or more existing icons to an application tray. Alternatively, the placement application may place one or more new pre-load icons into a folder and present a folder icon on a screen.

Generally, a virtual pre-load program may comprise a smaller program which provides a sample or limited version of a full sized/version of the program. Virtual pre-load programs may be provided in a pack, such as a virtual pre-load pack, instead of full version programs, because a virtual pre-load program may entail the transmission and/or storage of less data than a full version program. Thus, a virtual pre-load pack comprising a quantity of virtual pre-load programs may be transmitted faster to the mobile device than a full version application pack comprising the same quantity of full version programs and may occupy less memory on the mobile device after being installed than full version programs.

When a virtual pre-load program icon is displayed on the display screen of a mobile device, a mobile device user may select the displayed virtual pre-load program icon in order to sample and/or activate the program. The virtual pre-load program may invite the mobile device user to download a full version program related to the virtual pre-load program. The mobile device user may elect to download the full version application, for example, after using the virtual pre-load program and deciding that he/she wants the full version of the program for use on his/her mobile device. For further details about building and using virtual pre-load programs, see U.S. patent application Ser. No. 13/940,251, filed Jul. 11, 2013, entitled "Virtual Pre-installation of Applications," by Fared A. Adib, et al., and U.S. patent application Ser. No. 14/168,007, filed Jan. 30, 2014, entitled "Virtual Preloads," by David K. Fultz, et al., both of which are incorporated by reference herein, each in its entirety.

Some virtual pre-load programs may generally be installed on a mobile communication device at the time of manufacture. Virtual pre-load programs may be installed on mobile communication devices using a virtual pre-load pack comprising a plurality of virtual pre-load programs. Furthermore, once a mobile communication device is sold to a customer, mobile communication service providers and/or mobile device manufacturers may be reluctant to provide additional virtual pre-load packs as new virtual pre-load program icons inserted on the display screen of mobile communication devices may disrupt the personalized configuration of the displays and/or icons on the display screen of the mobile communication device.

The present disclose teaches that a virtual pre-load pack may comprise a virtual pre-load program icon template display overlay. A virtual pre-load program icon template display overlay, unlike a virtual pre-load program icon template display replacement, may allow the virtual pre-load pack to insert the icons and/or displays of virtual pre-load programs into display screen locations of the virtual display screen page without having to delete and re-insert the icons and/or displays of previously inserted programs and/or previously inserted virtual pre-load programs. Conversely, a virtual pre-load icon template display replacement may comprise the deletion of icons/displays of previously inserted programs and the re-insertion of the icons/displays of the previously inserted programs along with the insertion of the new virtual pre-load program icons/displays into the virtual display screen pages of the display screen of the mobile device.

By using a virtual pre-load icon template display overlay, the virtual pre-load pack may comprise only new virtual pre-load programs instead of previously inserted program icons and/or virtual pre-load program icons as well as the new virtual pre-load program icons. This may reduce the amount data transmitted in a virtual pre-load pack and/or increase the rate at which the virtual pre-load pack is transmitted from a server to the mobile communication device. Additionally, with a virtual pre-load icon template display replacement, and unlike a virtual pre-load icon template display overlay, the previously inserted virtual pre-load program icon displays may be inserted at display screen locations, for example, of the mobile communication service provider's choosing and thus disrupt the personalized configurations of the previous inserted program icon displays implemented by mobile device users on the display screen(s) of each mobile device(s). Furthermore, with a virtual pre-load icon template display replacement, and unlike a virtual pre-load icon template display overlay, the icons and/or displays of any programs individually downloaded by mobile device users may be deleted/lost when the virtual pre-load icon template display replacement is implemented on the mobile device.

A mobile application, for example the placement application discussed above, stored in the memory of the mobile communication device may identify and/or detect the receipt of a transmitted virtual pre-load pack and compare a virtual pre-load pack icon template from the transmitted virtual pre-load pack with a current icon display screen template provided by the mobile communication device. The virtual pre-load pack icon template may provide the proposed virtual pre-load program icon display screen locations so that the mobile application may identify if the proposed icon display screen locations may disrupt the display of the current icons of the programs currently stored on the mobile communication device. If the mobile application determines that a proposed icon display screen location of a virtual pre-load program icon display may disrupt the current icon displays on the display screen of the mobile communication device, the mobile application may move the proposed icon display screen location of the virtual pre-load program, consolidate the proposed icon display screen location area of the virtual pre-load program by decreasing the display screen location area and/or by storing the icon and/or display of the virtual pre-load program in a folder on the display screen. Alternatively, the mobile application may make small adjustments to the currently installed program icons and/or displays on the display screen of the of mobile communication device by moving the icons and/or displays slightly so as not to disrupt the overall personalized configuration of the display screen and/or by deleting icons and/or displays of programs and/or virtual pre-load programs that have not been used at all or for a predetermined amount of time by the mobile device owner.

Turning now to FIG. 1, a communication system 10 is described. The system 10 may comprise one or more mobile communication device(s) 12, base transceiver stations (BTS) 14a and 14b, a network 16, and a server 40. The mobile device(s) 12 may be a mobile phone, a personal digital assistant (PDA), a media player, or other communication enabled portable electronic device. In an embodiment, the mobile device(s) 12 may be implemented as a handset. Details of handsets are discussed further hereinafter. The base transceiver stations 14a and/or 14b provide a wireless communication link to the mobile device(s) 12 and couples the mobile device(s) 12 to the network 16. In an embodiment, the base transceiver stations 14a and/or 14b provide wireless communication links to the mobile device (s) 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 14a and/or 14b are illustrated in FIG. 1, it is understood that the communication system 10 may comprise two or more base transceiver stations 14 and any number of mobile device(s) 12. The network 16 may be a public communication network, a private communication network, or a combination thereof.

The server 40 may comprise a processor 42, a memory 44, and an application 46 stored in the memory 44. The server 40 may also comprise a plurality of processors located in a plurality of computers. Computers are discussed in more detail hereinafter. In an embodiment, the server 40 may be configured to store and/or transmit via the network 16 one or more virtual pre-load packs comprising at least one virtual pre-load program and a virtual pre-load template to the one or more mobile device(s) 12. The memory 44 may store the one or more virtual pre-load packs.

For example, a mobile communication service provider may have one or more new virtual pre-load programs which the service provider wishes to provide not only on mobile device(s) 12 which have not been purchased by a consumer, but mobile device(s) 12 which have already been purchased by the consumer. The virtual pre-load packs may comprise at least one virtual pre-load program. While the service provider may provide the one or more virtual pre-load packs to mobile device manufacturers to install on a newly manufactured mobile device 12, the service provider may transmit one or more virtual pre-load packs from the server 40, through the network 16, to the one or more mobile device 12. For example, the service provider may wish to transmit at least one virtual pre-load packs when the mobile device 12 has already been sold and/or is used by a mobile device user. Alternatively and/or additionally, the service provider may wish to withhold at least one virtual pre-load program from a mobile device manufacturer and provide at least one virtual pre-load program directly to the mobile device(s) 12 before being sold.

The mobile device(s) 12 may comprise a radio transceiver 20, a user interface 22, a display screen 23, and a memory 24. Alternatively, the mobile device(s) 12 may comprise two or more radio transceivers 20. The display screen 23 may be configured to display one or more icons and/or selection controls associated with programs stored on the mobile device(s) 12 so that a mobile device user may access at least one particular program of the one or more programs by selecting the icon and/or selection control identifying a program. In an embodiment, program(s) displayed on the display screen 23 may comprise a virtual pre-load application, a pre-load application, a virtual widget, a widget, or a short-cut. In an embodiment, the user interface 22 may comprise the display screen 23. As will be discussed further herein, the mobile application 27, stored in the memory 24, may be configured to display a newly installed virtual pre-load program in an unoccupied display screen location on the display screen 23 without overlapping the display of a previously installed virtual pre-load program with the display of the at least one previously inserted program on the display screen 23 and/or without disrupting the display of the at least one previously inserted program on the display screen 23.

The mobile application 27 may be configured to identify the receipt of a virtual pre-load pack by the mobile communication device 12, wherein the virtual pre-load pack comprises at least one virtual pre-load program and a virtual pre-load pack template. For example, a service provider may have transmitted a virtual pre-load pack of at least one virtual pre-load to be displayed on the display screen 23 of the mobile device 12. The mobile application 27 may identify the receipt of the virtual pre-load pack and examine the size and shape of each of the at least one virtual pre-load programs as well as the virtual pre-load template in response to identifying the receipt of the virtual pre-load pack in order to determine where each of the at least one virtual pre-load programs may be displayed on the display screen 23 of the mobile device 12 without overlapping and/or disrupting the display of at least one previously inserted program on the display screen 23 of the mobile device 12.

The at least one virtual pre-load program and/or the at least one previously inserted program may comprise at least one of a virtual pre-load application, an application (e.g. a full version application), a virtual widget, a widget, a short-cut, and/or the like. Virtual pre-load programs and/or previously inserted programs may be programs designed and/or provided by third party vendors, a mobile device manufacturer, and/or a mobile communication service provider. Generally, a virtual pre-load application may comprise a smaller application which provides a sample or limited version of a full size/version application. Virtual pre-load applications may be provided in a pack, such as a virtual pre-load pack, instead of full version applications because a virtual pre-load application may entail the transmission of less data than a full version application. Thus, a virtual pre-load pack comprising a quantity of virtual pre-load programs may be transmitted faster to the mobile device 12 than a full version application pack comprising the same quantity of full version applications. Furthermore, the virtual pre-loads may occupy less memory on the mobile device 12 after being installed.

When a virtual pre-load application and/or an icon representing the application is displayed on the display screen 23 of the mobile device 12, a mobile device user may select the displayed virtual pre-load application and/or icon in order to sample and/or activate the program. The virtual pre-load program may invite the mobile device user to download a full version application related to the virtual pre-load application. The mobile device user may elect to download the full version application, for example, after using the virtual pre-load application and deciding that he/she wants the full version application for use on his/her mobile device 12. Alternatively, the mobile device user may select the displayed virtual pre-load application and elect to not download the full version of the application, for example, because the full version application has an undesirable price associated with it, the sample provided by the virtual pre-load application was found un-useful and/or uninteresting by the mobile device user, and/or the full version application occupies too much memory on the mobile device 12. The mobile device user may elect to leave the virtual pre-load application on the display screen 23 of the mobile device 12 without installing the full version application associated with the virtual pre-load application or delete the virtual pre-load application from the display screen 23 of the mobile device 12.

In an embodiment, widgets may comprise interactive virtual tools that provide single-purpose services such as showing a mobile device user the latest news, the current weather, the time, a calendar, a dictionary, a map program, a calculator, notes, photo viewers, a language translator, and/or the like. Similar to virtual pre-load applications, virtual widgets may comprise a smaller widget which provides a sample or limited version of a full size/version widget which may invite a mobile device user to install a full version widget. In an embodiment, a shortcut may comprise a file in an operating system that points to another file or device. Shortcuts on a display screen 23 may provide convenient access to files that may be stored deep in the directory structure of the mobile device 12.

In an embodiment, the virtual pre-load template may provide a proposed display screen location of the plurality of display screen locations for the insertion of the virtual pre-load program. Display screen locations may comprise the location of at least one cell disposed on a display screen virtual page of a display screen 23. Display screen virtual pages may comprise one or more pages displaying icons and/or displays associated with programs stored in the mobile communication device 12. In an embodiment, the display screen 23 may show only one virtual display screen page. In an embodiment, the display screen 23 may be configured to scroll through multiple virtual display screen pages such that one virtual display screen may be displayed at any one time. For example, virtual pre-load programs and/or full version programs may be displayed in cells on a display screen 23. The cells may be arranged in columns and rows on a display screen virtual page and/or may be displayed in designated areas of the display screen 23 and/or the display screen virtual page specifically for virtual pre-load program displays. The display screen 23 may be configured to display at least one display screen virtual page with at least one cell for displaying a virtual pre-load program and/or a full version program. Multiple display screen virtual pages may allow for the displaying of multiple virtual pre-load programs and/or multiple full version programs so that a first virtual pre-load programs and/or a first full version program may be displayed on a first virtual display screen page and a second virtual pre-load program and/or a second full version program may be displayed on a second virtual display screen page. A mobile device user may be able to move between virtual display screen pages on a display screen 23 in order to locate a particular virtual pre-load program and/or a full version program installed on the mobile device 12.

The virtual pre-load pack template may provide a proposed display screen location for the display of at least one virtual pre-load program on the display screen 23 of the mobile device 12. For example, a service provider may transmit a virtual pre-load pack comprising three new virtual pre-load programs. The virtual pre-load pack may also comprise a virtual pre-load pack template that provides a virtual template of the cell layout (e.g. the cell locations) for each of the at least one virtual display screen pages of the display screen 23 of the mobile device 12. The virtual pre-load pack template may also comprise the proposed display screen locations for each of the three new virtual pre-load programs in the cells of the virtual display screen pages of the display screen 23.

For example, the virtual pre-load pack template may comprise a template proposing that a first new virtual pre-load program display screen location occupy three cells on the second virtual display screen page: the cell located at column 2, row 4, the cell located at column 3, row 4, and the cell located at column 4, row 4. The virtual pre-load pack template may also comprise a template proposing that a second new virtual pre-load program display screen location occupy four cells on the third virtual display screen page: the cell located at column 2, row 4, the cell located at column 1, row 4, the cell located at column 1, row 3, and the cell located at column 1, row 2. The virtual pre-load pack template may also comprise a template proposing that a third new virtual pre-load program display screen location occupy four cells on the first virtual display screen page: the cell located at column 1, row 1, the cell located at column 2, row 1, the cell located at column 1, row 2, and the cell located at column 2, row 2. While the virtual pre-load pack template comprises the proposed display screen locations of each of the three virtual pre-load programs, the virtual pre-load pack template does not provide the display screen locations of the previously inserted programs in the virtual display screen pages of the display screen 23 because the mobile communication service provider does not know the display arrangement of each of the previously inserted programs on each mobile device 12 receiving the virtual pre-load pack, as each mobile device owner may personalize the display arrangement of the previously inserted programs on the display screens 23.

In an embodiment, the virtual pre-load pack template may comprise a virtual pre-load program template display overlay. A virtual pre-load program template display overlay, unlike a virtual pre-load program template display replacement, may allow the virtual pre-load pack to insert the displays of the at least one virtual pre-load program from the virtual pre-load pack into display screen locations of the virtual display screen page of the display screen 23 without having to delete and re-insert the displays of previously inserted programs and/or the displays of previously inserted virtual pre-load programs. Conversely, a virtual pre-load template display replacement may comprise the deletion of displays of previously inserted programs and the re-insertion of the displays of the previously inserted programs along with the insertion of the new virtual pre-load program displays into the virtual display screen pages of the display screen 23.

By using a virtual pre-load template display overlay, the virtual pre-load pack may comprise only new virtual pre-load programs instead of previously inserted programs and/or virtual pre-load programs as well as the new virtual pre-load programs. This may reduce the amount of data transmitted in a virtual pre-load pack and/or increase the rate by which the virtual pre-load pack is transmitted from the server 40 to the mobile device(s) 12. Additionally, with a virtual pre-load template display replacement and unlike a virtual pre-load template display overlay, the previously inserted virtual pre-load program displays may be inserted at display screen locations, for example, of the mobile communication service provider's choosing and thus disrupting the personalized configurations of the previous inserted program displays implemented by mobile device users on the display screen(s) 23. Furthermore, with a virtual pre-load template display replacement, and unlike a virtual pre-load template display overlay, the displays of any programs individually downloaded by mobile device users may be deleted and/or lost when the virtual pre-load template display replacement is implemented on the mobile device 12.

In an embodiment, a service provider transmitting the virtual pre-load pack may have chosen the proposed virtual pre-load program display screen locations based on a display screen insertion priority. The display screen insertion priority may authorize a virtual pre-load program for insertion into a display screen location of the plurality of display screen locations comprising at most a predetermined level of viewing frequency. A viewing frequency refers to how often a display object is viewed or displayed per unit of time. In an embodiment, each time a display screen that an icon or other display object that is not currently presented on the display screen is then presented on the display screen, for example when an inactive application is selected to be active, a counter may be incremented. In an embodiment, the predetermined level of viewing frequency may be based on a viewing frequency of a display screen location of the plurality of display screen locations relative to a viewing frequency of a different display screen location of the plurality of display screen locations. For example, a service provider and/or a mobile communication device manufacturer may determine that display screen locations located at the top of a virtual display screen page are viewed more frequently compared with display screen locations located at the bottom of a virtual display screen page. Furthermore, a service provider and/or a mobile communication device manufacturer may determine that display screen locations located at the left side of a virtual display screen page are viewed more frequently compared with display screen locations located at the right side of a virtual display screen page. Additionally, a service provider and/or a mobile communication device manufacturer may determine that display screen locations located at the first virtual display screen page are viewed more frequently compared with display screen locations located on the second virtual display screen page.

In an embodiment, a third party vendor, for example, may have negotiated with a mobile communication service provider to insert a virtual pre-load program on to the displays screens of mobile device(s) 12 comprising mobile devices currently being used by mobile device users. Specifically, the third party vendor may have negotiated for a particular level of display screen insertion priority allowing the virtual pre-load program display to be displayed in one or more display screen locations identified as the second most frequently viewed display screen locations. Thus, when a virtual pre-load pack template proposes display screen locations for third party vender's virtual pre-load program display, the proposed display screen locations may comprise locations no better than display screen locations identified as display screen locations viewed more frequently than all but one set of display screen locations on the display screen 23. In an embodiment, when no display screen locations identified as the second most frequently viewed display screen locations are available for the third party vender virtual pre-load program display, the mobile application 27, as will de disclosed further herein, may move the proposed display screen location of the third party vender virtual pre-load program displays to a third most frequently viewed display screen location, a fourth most frequently view display screen, and so on. However, the mobile application 27 may not move the proposed display screen location to the first most frequently viewed display screen location as doing so would violate the display screen insertion priority assigned to the third party vender virtual pre-load program.

In an embodiment, the predetermined level of viewing frequency may be based on a viewing frequency of a display screen location of the plurality of display screen locations with an individual mobile device 12 relative to a viewing frequency of a different display screen location of the plurality of display screen locations of the same individual mobile device 12. For example, the mobile application 27 may determine that mobile device users of the particular mobile device 12 storing the mobile application 27 may access and/or view programs displayed in the middle of the second virtual display screen page the most, programs displayed at the bottom of the first virtual display screen page the second most, but programs displayed at the bottom of the fifth virtual display screen page the least. A third party vendor may have negotiated for a particular level of display screen insertion priority allowing the virtual pre-load program display to be displayed in one or more display screen locations identified as the second most frequently viewed display screen locations. The mobile application 27 may transmit via the network 16 to the server 40 information differentiating display screen locations on the display screen 23 of the mobile device 12 into different levels of viewing frequency. Thus, when a virtual pre-load pack template proposes display screen locations for third party vender's virtual pre-load program display, the proposed display screen locations may comprise locations with no higher a viewing frequency than display screen locations identified as display screen locations viewed more frequently than all but one set of display screen locations on the display screen 23.

In an embodiment, the virtual pre-load pack may comprise a virtual pre-load pack template that provides a virtual template of the virtual display screen page compatible with a non-cell and/or free-form layout. Similar to previous embodiments, a mobile communication service provider, a mobile device manufacturer and/or a mobile application 27 may identify boundaries differentiating areas on a non-cell and/or free-form display screen 23 by viewing frequency and/or program access or use frequency. Thus, when a virtual pre-load pack template proposes display screen locations for a virtual pre-load program display, the proposed display screen locations may comprise sectioned display screen locations with no higher a viewing frequency than sectioned display screen locations identified as display screen locations with a level of viewing frequency commensurate with a display screen insertion priority.

The mobile application 27 may be configured to compare the virtual pre-load pack template with a current display screen template, wherein the current display screen template provides the display screen location of the at least one previously inserted program display. For example, after the mobile application 27 identifies the receipt of a virtual pre-load pack by the mobile device(s) 12. The mobile application 27 may generate a current display screen template based on the current locations of at least one previously inserted program displays in the one or more virtual screen display pages of the display screen 23. The mobile application 27 may compare the virtual pre-load pack template with the current display screen template to identify the display locations of previously inserted program displays relative to the proposed display screen locations of the virtual pre-load program displays.

The mobile application 27 may be configured to identify, based on the comparison of the virtual pre-load pack template with the current display screen template, that the proposed display screen location of the at least one virtual pre-load program display overlaps with the display screen location of the at least one previously inserted program display. For example, the virtual pre-load pack template may comprise a template proposing that a first new virtual pre-load program display screen location occupy three cells on the second virtual display screen page: the cell located at column 2, row 4, the cell located at column 3, row 4, and the cell located at column 4, row 4. The virtual pre-load pack template may also comprise a template proposing that a second new virtual pre-load program display screen location occupy four cells on the third virtual display screen page: the cell located at column 2, row 4, the cell located at column 1, row 4, the cell located at column 1, row 3, and the cell located at column 1, row 2. The virtual pre-load pack template may also comprise a template proposing that a third new virtual pre-load program display screen location occupy four cells on the first virtual display screen page: the cell located at column 1, row 1, the cell located at column 2, row 1, the cell located at column 1, row 2, and the cell located at column 2, row 2.

Furthermore, the current display screen template may comprise a template indicating that a first previously inserted program display screen location occupies three cells on the fifth virtual display screen page: the cell located at column 5, row 4, the cell located at column 6, row 4, and the cell located at column 7, row 4. The current display screen template may also comprise a template indicating that a second previously inserted program display screen location occupies four cells on the third virtual display screen page: the cell located at column 2, row 4, the cell located at column 3, row 4, the cell located at column 3, row 3, and the cell located at column 3, row 2. The current display screen template may also comprise a template indicating that a third previously inserted program display screen location occupies four cells on the first virtual display screen page: the cell located at column 1, row 1, the cell located at column 2, row 1, the cell located at column 1, row 2, and the cell located at column 2, row 2.

The mobile application 27 may compare the virtual pre-load pack template with the current display screen template and identify, based on the comparison of the virtual pre-load pack template with the current display screen template, that the second new virtual pre-load program display screen location overlaps with the second previously inserted program display screen location and the third new virtual pre-load program display screen location overlaps with the third previously inserted program display screen location. Furthermore, the mobile application 27 may also identify that the first new virtual pre-load program display screen location does not overlap with any previously inserted program display screen locations.

In an embodiment, the virtual pre-load pack template may comprise a template indicating the display screen insertion priority of the first new virtual pre-load program display screen location. The display screen insertion priority of the first, second, and third new virtual pre-load programs may be based on each of the first, second, and third new virtual pre-load programs proposed display screen location. For example, because the virtual pre-load pack template indicates that the first new pre-load display screen location occupies the three specified cells on the second virtual display screen page, the virtual pre-load pack template may indicate to the mobile application 27 that the first new virtual pre-load program may have a display screen insertion priority commensurate with at most a second most frequently viewed display screen location. Additionally, because the virtual pre-load pack template indicates that the second new pre-load display screen location occupies the four specified cells on the third virtual display screen page, the virtual pre-load pack template may indicate to the mobile application 27 that the second new virtual pre-load program may have a display screen insertion priority commensurate with at most a fourth most frequently viewed display screen location. Furthermore, because the virtual pre-load pack template indicates that the third new pre-load display screen location occupies the four specified cells on the first virtual display screen page, the virtual pre-load pack template may indicate to the mobile application 27 that the third new virtual pre-load program may have a display screen insertion priority commensurate with the most frequently viewed display screen location.

The mobile application 27 may be configured to locate and select, in response to identifying that the proposed display screen location of the at least one virtual pre-load program display overlaps with the display screen location of the at least one previously inserted program display, an unoccupied display screen location of the plurality of display screen locations for the insertion of the at least one virtual pre-load program display based on the comparison of the virtual pre-load pack template with the current display screen template. For example, the mobile application 27 may have identified that the second new virtual pre-load program display screen location overlaps with the second previously inserted program display screen location and the third new virtual pre-load program display screen location overlaps with the third previously inserted program display screen location.

The mobile application 27 may then locate a set of four unoccupied cells for the second new virtual pre-load program display screen location such as the unoccupied cells located on the third virtual display screen page at column 3, row 4, at column 4, row 4, at column 4, row 3, and at column 4, row 2. The mobile application 27 may then select those four unoccupied cells and reconfigure the proposed virtual pre-load pack template so that the second new virtual pre-load programs display screen location comprises the newly selected cells. Furthermore, the mobile application 27 may then locate a set of four unoccupied cells for the third new virtual pre-load program display screen location such as the unoccupied cells located on the first virtual display screen page at column 4, row 3, at column 4, row 4, at column 5, row 3, and at column 5, row 4. Additionally, because the proposed display screen location of the first virtual pre-load program does not overlap with any of the display screen locations of the previously inserted programs, the mobile application 27 does not locate a new a set of unoccupied cells for the proposed display screen location of the first virtual pre-load program.

The mobile application 27 may select the four unoccupied cells in the virtual pre-load pack template for the display screen location of the second new virtual pre-load program and the four unoccupied cells in the virtual pre-load pack template for the display screen location of the third new virtual pre-load program. The mobile application 27 may reconfigure the proposed virtual pre-load pack template so that the second new virtual pre-load program display screen location and the third new virtual pre-load program display screen location comprises the newly selected unoccupied cells. In an embodiment, the unoccupied display screen location may not overlap with the display screen location of the at least one previously inserted program. For example, the set of four unoccupied cells located and selected for the second new virtual pre-load program display screen location as well as the set of four unoccupied cells located and selected for the third new virtual pre-load program display screen location do not overlap with any of the display screen locations of the previous inserted program displays. In an embodiment, the set of four unoccupied cells located and selected for the second new virtual pre-load program display screen location as well as the set of four unoccupied cells located and selected for the third new virtual pre-load program display screen location may not overlap with any of the proposed display screen locations of the virtual pre-load programs of the virtual pre-load pack.

In an embodiment, the unoccupied display screen location comprises different dimensions but the same area as the proposed display screen location so that when the at least one virtual pre-load program is inserted and displayed in the unoccupied display screen location on the display screen, the at least one virtual pre-load program comprises the same dimensions as the unoccupied display screen location. For example, a proposed display screen location of a virtual pre-load program display may comprise an "L" shaped configuration. However, the display screen may be heavily occupied by previously inserted program displays, but may have a single row or a single column which is unoccupied. The mobile application 27 may reshape the display of the virtual pre-load program and thus the proposed virtual screen location from an "L" shaped configuration to single row or a single column shaped configuration so that when the display of the virtual pre-load program is inserted into the display screen 23, the display of the virtual pre-load program does not overlap any other program and/or virtual pre-load program displays.

In an embodiment, the unoccupied display screen location may not exceed the display screen insertion priority. For example, a mobile communication service provider, a mobile device manufacturer, and/or a mobile application 27 may identify that a first virtual display screen page of a plurality of display screen pages of a display screen 23 may have the highest viewing frequency, and a second virtual display screen page through an eighth virtual displays screen page may comprise descending viewer frequency. Thus, each of the first through the eighth virtual display screen pages may be associated with a different display screen insertion priority. In an embodiment, a virtual pre-load pack template may indicate to the mobile application 27 that a first new virtual pre-load program may have a display screen insertion priority commensurate with at most a second most frequently viewed display screen location. Additionally, in an embodiment, a virtual pre-load pack template may indicate to the mobile application 27 that a second new virtual pre-load program may have a display screen insertion priority commensurate with at most a fourth most frequently viewed display screen location. Furthermore, in an embodiment, a virtual pre-load pack template may indicate to the mobile application 27 that a third new virtual pre-load program may have a display screen insertion priority commensurate with the most frequently viewed display screen location.

Thus, for the first new virtual pre-load program the mobile application 27 may locate and select an unoccupied display screen location on the second through the eighth virtual display screen pages, but not for the first virtual display screen page as the display screen insertion priority of the first new virtual pre-load program is commensurate with the viewing frequency of the second virtual display screen page. Additionally, for the second new virtual pre-load program the mobile application 27 may locate and select an unoccupied display screen location on the fourth through the eighth virtual display screen pages, but not for the first through the third virtual display screen page as the display screen insertion priority of the second new virtual pre-load program is commensurate with the viewing frequency of the fourth virtual display screen page. Furthermore, for the third new virtual pre-load program the mobile application 27 may locate and select an unoccupied display screen location on the first through the eighth virtual display screen pages as the display screen insertion priority of the third new virtual pre-load program is commensurate with the viewing frequency of the first virtual display screen page.

In an embodiment, the mobile application 27 may locate and select at least two unoccupied display screen locations of the plurality of display screen locations for the insertion of the at least one virtual pre-load program based on the comparison of the virtual pre-load pack template with the current display screen template. The mobile application 27 may display a notification on the display screen prompting a mobile device user to provide a user selection of one unoccupied display screen location of the at least two unoccupied display screen locations. The mobile application 27 may receive the user selection of the one unoccupied display screen location of the at least two unoccupied display screen locations and insert the at least one virtual pre-load program in the one unoccupied display screen location, wherein the one unoccupied display screen location is based on the received user selection.

In an embodiment, when the display screen 23 of the mobile device 12 is a free-form display screen, the mobile application 27 may locate and select an unoccupied area at least a predetermined distance away from the display screen location of the previously inserted program display. For example, the mobile application 27 may locate and select an unoccupied display screen location that comprises a distance which is a fraction of at least one dimension of the entire display screen 23, a distance away based on the width and/or the height of the previously inserted program display and/or the width and/or the height of the virtual pre-load program display, a distance based on the size of the display screen pixels, so that the display of the previously inserted program display may be differentiated from the display of the virtual pre-load program display, and/or the like.

In an embodiment, the mobile application 27 may insert the at least one virtual pre-load program display in the unoccupied display screen location on the display screen 23 without overlapping the display of the at least one virtual pre-load program with the display of the at least one previously inserted program and without exceeding the display screen insertion priority. For example, the mobile application 27 may examine the reconfigured virtual pre-load pack template and insert the virtual pre-load program displays of the virtual pre-load programs from the virtual pre-load pack into the locations of the display screen 23 based on the display screen locations depicted by the reconfigured virtual pre-load pack template. Additionally, because the mobile application 27 reconfigured the display screen locations of the virtual pre-load pack template, as previously described, the displays of the virtual pre-load programs may not overlap any previously inserted program displays and/or any other displays of virtual pre-load programs provided in the virtual pre-load pack. Furthermore, because the mobile application 27 reconfigured the display screen locations of the virtual pre-load pack template, as previously described, the displays of the virtual pre-load programs may not exceed a display screen insertion priority. The mobile application 27 may configure the display screen 23 to display the virtual pre-load program displays in unoccupied locations on the display screen 23 of the mobile device 12.

In an embodiment, after the virtual pre-load program displays have been inserted and displayed on the display screen 23 of the mobile device 12, the mobile application 27 may provide a notification that the at least one virtual pre-load program is displayed on the display screen. The mobile application 27 may provide an email, a text, a notification window, and/or the like to a mobile device user informing the mobile device user that new virtual pre-load programs are available for access on the display screen 23 of the mobile device 12. In an embodiment, the mobile application 27 may provide a notification on at least a display screen location comprising the highest viewing frequency and/or the viewing screen that the mobile device user is currently viewing.

In an embodiment, the display screen may comprise at least one restricted display screen location of the plurality of display screen locations, wherein the unoccupied display screen location does not overlap with the restricted display screen location of the plurality of display screen locations, and wherein the at least one virtual pre-load program is inserted and displayed on the display screen without overlapping with the restricted display screen location of the plurality of display screen locations. For example, a mobile device manufacturer may have designated the first virtual display screen page exclusively for applications, widgets, and/or the like provided by the mobile device manufacturer. Thus, if a virtual pre-load pack template proposes that at least one virtual pre-load program display is displayed in a display screen location that at least overlaps with a restricted display screen location, the mobile application 27 may move and/or reconfigure the virtual pre-load pack template, in a similar way as previously described with respect to previously inserted program displays, so that the at least one virtual pre-load program display does not overlap with the restricted display screen location.

In an embodiment, after the mobile application 27 compares the virtual pre-load pack template with a current display screen template, wherein the current display screen template provides the display screen location of the at least one previously inserted program, the mobile application may identify, based on the comparison of the virtual pre-load pack template with the current display screen template, that no display screen location of the plurality of display screen locations comprises an area at least equivalent to the proposed display screen location without overlapping with the display screen location of the at least one previously inserted program. The mobile application 27 may locate and select an unoccupied display screen location of the plurality of display screen locations for the insertion of the at least one virtual pre-load program based on the comparison of the virtual pre-load pack template with the current display screen template, wherein the unoccupied display screen location comprises an area less than the area of the proposed display screen location.

For example, a proposed display screen location of a virtual pre-load program display provided by the virtual pre-load pack template may comprise four cells in a square-shaped configuration. However, only single unoccupied cells may be available in the display screen 23 as the display screen 23 is full of program displays. The mobile application 27 may locate and select a single unoccupied cell and generate, based on selecting the unoccupied display screen location (e.g. the single unoccupied cell), a folder configured to store the at least one virtual pre-load program display and configured to fit within the area of the unoccupied display screen location (e.g. the single cell display screen location area). The mobile application 27 may store the at least one virtual pre-load program display in the folder and insert the folder in the selected unoccupied display screen location on the display screen 23 without overlapping the display of the folder with the display of the at least one previously inserted program and without exceeding the display screen insertion priority.

In an embodiment, the folder may maintain a view of each of the at least one virtual pre-load program displays on the display screen 23 up to a predetermined quantity of the at least one virtual pre-load programs stored in the folder. For example, a display screen 23 may have all but one cell occupied with previously inserted program displays. A virtual pre-load pack may comprise four virtual pre-load programs. The folder may be configured to display, for example, in miniature form, the displays of each of the four virtual pre-load programs of the virtual pre-load pack stored in the folder. Thus, when the folder is inserted into the unoccupied display screen location of the display screen 23 of the mobile device 12, on the face of the folder, the displays of each of the four virtual pre-load programs of the virtual pre-load pack stored in the folder will be displayed on the display screen 23. In an embodiment, if a mobile device user wishes to access any of the four virtual pre-load programs stored in the folder, the mobile device user may select and open the folder providing a window with original sized displays of the virtual pre-load programs.

In an embodiment, when a quantity of the at least one virtual pre-load program stored in the folder exceeds the predetermined quantity so that folder may not be able to maintain a view of all the virtual pre-load program displays on the display screen 23, and when the predetermined quantity is greater than one, the application may remove at least one excess virtual pre-load program of the at least one virtual pre-load program stored in the folder so that the quantity of the at least one virtual pre-load program in the folder does not exceed the predetermined quantity. This allows the folder to maintain a view of all the displays of the virtual pre-load programs stored in the folder. The mobile application 27 may locate and select another unoccupied display screen location of the plurality of display screen locations for the insertion of the at least one excess virtual pre-load program based on the comparison of the virtual pre-load pack template with the current display screen template, wherein the other unoccupied display screen location does not overlap with the display screen location of the at least one previously inserted program and the folder, and wherein the other unoccupied display screen location does not exceed the display screen insertion priority. The mobile application 27 may insert the at least one excess virtual pre-load program in the other unoccupied display screen location on the display screen without overlapping the display of the at least one virtual pre-load program with the display of the previously inserted program as well as the display of the folder and without exceeding the display screen insertion priority. In an embodiment, the mobile application 27 may generate another folder similar to previous embodiments.

For example, the folder may be configured to display in miniature form the displays of as many as four virtual pre-load programs of a virtual pre-load pack. However, a virtual pre-load pack may comprise five virtual pre-load programs. The mobile application 27 may store four of the five virtual pre-load program displays in a folder as previously discussed but may be unable to store the fifth virtual pre-load program display. The mobile application 27 may identify an unoccupied display screen location on another virtual display screen page and insert the fifth virtual pre-load program into the unoccupied display screen location on the other virtual display screen page.

In an embodiment, after the mobile application 27 identifies, based on the comparison of the virtual pre-load pack template with the current display screen template, that no display screen location of the plurality of display screen locations comprises an area at least equivalent to the proposed display screen location without overlapping with the display screen location of the at least one previously inserted program, the mobile application 27 may calculate, in response to identifying that no display screen location of the plurality of display screen locations comprises an area at least equivalent to the proposed display screen location without overlapping with the display screen location of the at least one previously inserted program, one or more modifications to the display screen location of the at least one previously inserted program based on the comparison of the virtual pre-load pack template with the current display screen template so that an unoccupied display screen location comprising an area at least equivalent to the proposed display screen location is generated without overlapping with the display screen location of the at least one previously inserted program, wherein the unoccupied display screen location does not exceed the display screen insertion priority.

For example, the one or more modifications may comprise a minimum number of display screen location changes. The mobile application 27 may identify that only one previously inserted program display may be modified to provide enough display screen location space to insert a display of virtual pre-load program. In an embodiment, the one or more modifications may comprise moving the display screen location of the at least one previously inserted program from an initial display screen location to a subsequent display screen location so that at least one cell of the subsequent display screen location is adjacent to at least one cell of the initial display screen location. The previously inserted program display may be moved one row up and/or one row down and/or one column over to the left and/or one column over to the right in order to provide enough display screen location area/space to insert the display of the new virtual pre-load program. In an embodiment, the one or more modifications may comprise moving the display screen location of the at least one previously inserted program from an initial display screen location to a subsequent display screen location, wherein the initial display screen location and the subsequent display screen location are located on the same display screen virtual page, for example the second virtual display screen page.

In an embodiment, when the display screen 23 of the mobile device 12 is a free-form display screen, the one or more modifications may comprise moving the at least one previously inserted program display a minimum distance from the display initial display screen location. For example, the mobile application 27 may locate and selected an unoccupied area at least a predetermined distance away from the initial display screen location of the previously inserted program display in order to provide enough display screen location area/space to insert the display of the new virtual pre-load program into the display screen 23. For example, the mobile application 27 may locate and select an unoccupied display screen location that comprises a distance which is a fraction of at least one dimension of the entire display screen 23, a distance away based on the width and/or the height of the previously inserted program display and/or the width and/or the height of the virtual pre-load program display to be inserted, a distance based on the size of the display screen pixels, so that the display of the previously inserted program display may be differentiated from the display of the virtual pre-load program display, and/or the like.

In an embodiment, a previously inserted program display modification may comprise that at least one previously inserted program display may be deleted and/or removed from the display screen 23 in order to provide enough display screen location area/space to insert the display of the virtual pre-load program. For example, the mobile application 27 may detect at least one previously inserted virtual pre-load program of the at least one previously inserted program and deleting the at least one previously inserted virtual pre-load program. The mobile application 27 may detect that a previously inserted program may be a virtual pre-load application that was never fully loaded and/or used. Based on detecting that the previously inserted program may be a virtual pre-load application that was never fully loaded and/or used, the mobile application 27 may delete and/or remove the display associated with the unused virtual pre-load application to provide enough display screen location area/space to insert the display of the new virtual pre-load program. The mobile application 27 may also detect that the at least one previously inserted program has not been used for at least a predetermined amount of time, such as one or months and/or one or more years and delete and/or remove the display associated with the program which has not been used for at least a predetermined amount of time in order to provide enough display screen location area/space to insert the display of the new virtual pre-load program.

The mobile application 27 may modify the display screen location of the at least one previously inserted program based on the calculation of the one or more modifications creating the unoccupied display screen location on the display screen 23 and insert the at least one virtual pre-load program in the unoccupied display screen location on the display screen without overlapping the display of the at least one virtual pre-load program with the display of the at least one previously inserted program and without exceeding the display screen insertion priority.

Figure 2:
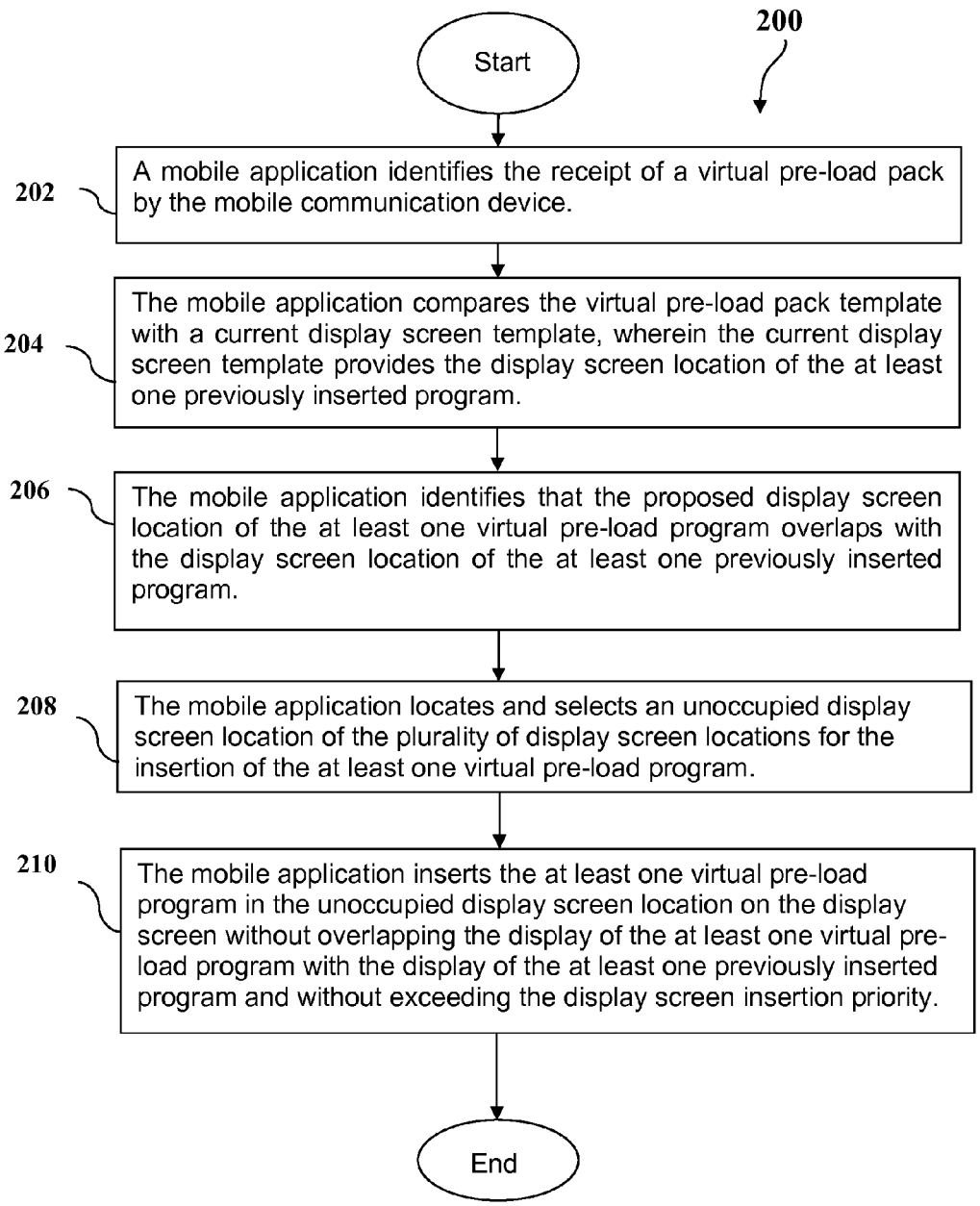
FIG. 2 is a flow chart of a method according to an embodiment of the disclosure.

In FIG. 2, a method 200 is disclosed. At block 202, a mobile application 27 may identify the receipt of a virtual pre-load pack by the mobile communication device 12, wherein the virtual pre-load pack comprises at least one virtual pre-load program and a virtual pre-load pack template, wherein the virtual pre-load pack template provides a proposed display screen location of the plurality of display screen locations for the insertion of the at least one virtual pre-load program, wherein the proposed display screen location is based on a display screen insertion priority. In an embodiment, the method 200 may comprise that the display screen insertion priority authorizes a virtual pre-load program for insertion into a display screen location of the plurality of display screen locations comprising at most a predetermined level of viewing frequency.

At block 204, the mobile application 27 may compare the virtual pre-load pack template with a current display screen template, wherein the current display screen template provides the display screen location of the at least one previously inserted program. At block 206, the mobile application 27 may identify, based on the comparison of the virtual pre-load pack template with the current display screen template, that the proposed display screen location of the at least one virtual pre-load program overlaps with the display screen location of the at least one previously inserted program.

At block 208, the mobile application 27 may locate and select, in response to identifying that the proposed display screen location of the at least one virtual pre-load program overlaps with the display screen location of the at least one previously inserted program, an unoccupied display screen location of the plurality of display screen locations for the insertion of the at least one virtual pre-load program based on the comparison of the virtual pre-load pack template with the current display screen template, wherein the unoccupied display screen location does not overlap with the display screen location of the at least one previously inserted program, and wherein the unoccupied display screen location does not exceed the display screen insertion priority. At block 210, the mobile application 27 may insert the at least one virtual pre-load program in the unoccupied display screen location on the display screen without overlapping the display of the at least one virtual pre-load program with the display of the at least one previously inserted program and without exceeding the display screen insertion priority.

In an embodiment, the at least one virtual pre-load program may comprise a virtual pre-load application, an application, a virtual widget, a widget, or a short-cut and the at least one previously inserted program comprises a virtual pre-load application, an application, a virtual widget, a widget, or a short-cut. In an embodiment, the display screen 23 may comprise at least one restricted display screen location of the plurality of display screen locations, wherein the unoccupied display screen location does not overlap with the restricted display screen location of the plurality of display screen locations, and wherein the at least one virtual pre-load program is inserted and displayed on the display screen without overlapping with the restricted display screen location of the plurality of display screen locations.

In an embodiment, the predetermined level of viewing frequency may be based on a viewing frequency of a display screen location of the plurality of display screen locations relative to a viewing frequency of a different display screen location of the plurality of display screen locations. In an embodiment, the display screen 23 may comprise at least one display screen virtual page, wherein each of the at least one display screen virtual pages comprises at least one cell, and wherein a display screen location comprises at least one cell.

In an embodiment, the mobile application 27 may locate and select, in response to identifying that the proposed display screen location of the at least one virtual pre-load program overlaps with the display screen location of the at least one previously inserted program, at least two unoccupied display screen locations of the plurality of display screen locations for the insertion of the at least one virtual pre-load program based on the comparison of the virtual pre-load pack template with the current display screen template. In an embodiment, the mobile application 27 may display a notification on the display screen prompting a user to provide a user selection of one unoccupied display screen location of the at least two unoccupied display screen locations. In an embodiment, the mobile application 27 may receive the user selection of the one unoccupied display screen location of the at least two unoccupied display screen locations and inserting the at least one virtual pre-load program in the one unoccupied display screen location, wherein the one unoccupied display screen location is based on the received user selection.

In an embodiment, the unoccupied display screen location may comprise different dimensions but the same area as the proposed display screen location so that when the at least one virtual pre-load program is inserted and displayed in the unoccupied display screen location on the display screen, the at least one virtual pre-load program comprises the same dimensions as the unoccupied display screen location. In an embodiment, the mobile application 27 may provide a notification that the at least one virtual pre-load program is displayed on the display screen. In an embodiment, the unoccupied display screen location may comprise a designated display screen location for virtual pre-load programs.

Figure 3A:
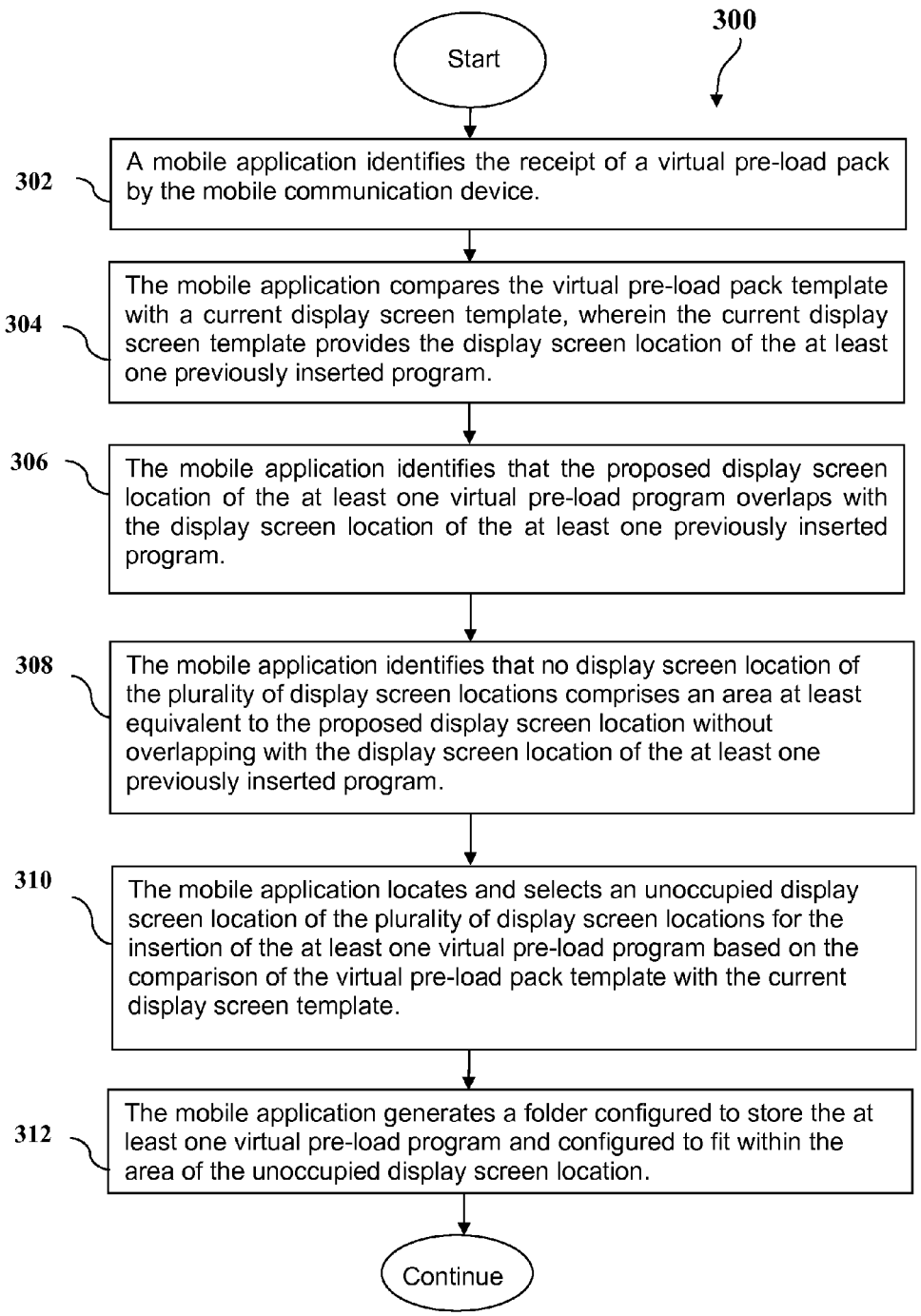
FIGS. 3A and 3B comprise a flow chart of a method according to an embodiment of the disclosure.
Figure 3B:
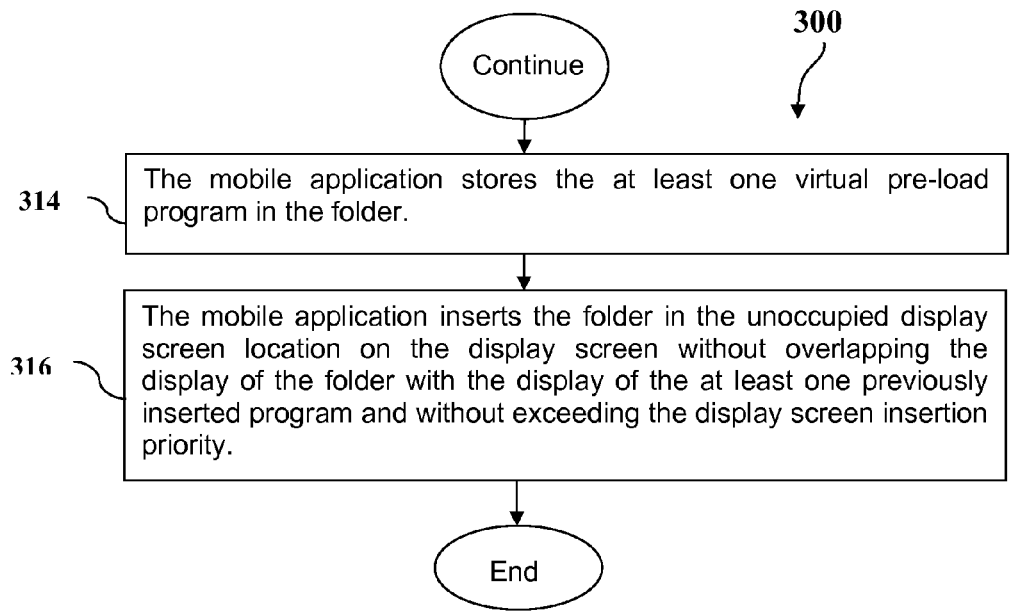

In FIGS. 3A and 3B, a method 300 is disclosed. At block 302, a mobile application 27 may identify the receipt of a virtual pre-load pack by the mobile communication device 12, wherein the virtual pre-load pack comprises at least one virtual pre-load program and a virtual pre-load pack template, wherein the virtual pre-load pack template provides a proposed display screen location of the plurality of display screen locations for the insertion of the at least one virtual pre-load program, wherein the proposed display screen location is based on a display screen insertion priority. In an embodiment, the display screen insertion priority may authorize a virtual pre-load program for insertion into a display screen location of the plurality of display screen locations comprising at most a predetermined level of viewing frequency.

At block 304, the mobile application 27 may compare the virtual pre-load pack template with a current display screen template, wherein the current display screen template provides the display screen location of the at least one previously inserted program. At block 306, the mobile application 27 may identify, based on the comparison of the virtual pre-load pack template with the current display screen template, that the proposed display screen location of the at least one virtual pre-load program overlaps with the display screen location of the at least one previously inserted program.

At block 308, the mobile application 27 may identify, based on the comparison of the virtual pre-load pack template with the current display screen template, that no display screen location of the plurality of display screen locations comprises an area at least equivalent to the proposed display screen location without overlapping with the display screen location of the at least one previously inserted program. At block 310, the mobile application 27 may locate and select an unoccupied display screen location of the plurality of display screen locations for the insertion of the at least one virtual pre-load program based on the comparison of the virtual pre-load pack template with the current display screen template, wherein the unoccupied display screen location comprises an area less than the area of the proposed display screen location, wherein the unoccupied display screen location does not overlap with the display screen location of the at least one previously inserted program, and wherein the unoccupied display screen location does not exceed the display screen insertion priority.

At block 312, the mobile application 27 may generate, based on selecting the unoccupied display screen location, a folder configured to store the at least one virtual pre-load program and configured to fit within the area of the unoccupied display screen location. At block 314, the mobile application 27 may store the at least one virtual pre-load program in the folder. At block 316, the mobile application 27 may insert the folder in the unoccupied display screen location on the display screen without overlapping the display of the folder with the display of the at least one previously inserted program and without exceeding the display screen insertion priority.

In an embodiment, the folder may maintain a view of each of the at least one virtual pre-load program on the display screen 23 up to a predetermined quantity of the at least one virtual pre-load programs stored in the folder. In an embodiment, when a quantity of virtual pre-load programs in the folder exceeds the predetermined quantity, and when the predetermined quantity is greater than one, the mobile application 27 may remove at least one excess virtual pre-load program of the virtual pre-load programs stored in the folder so that the quantity of the at least one virtual pre-load program in the folder does not exceed the predetermined quantity. The mobile application 27 may locate and select another unoccupied display screen location of the plurality of display screen locations for the insertion of the at least one excess virtual pre-load program based on the comparison of the virtual pre-load pack template with the current display screen template, wherein the other unoccupied display screen location does not overlap with the display screen location of the at least one previously inserted program and the folder, and wherein the other unoccupied display screen location does not exceed the display screen insertion priority. The mobile application 27 may insert the at least one excess virtual pre-load program in the other unoccupied display screen location on the display screen without overlapping the display of the at least one virtual pre-load program with the display of the at least previously inserted program as well as the display of the folder and without exceeding the display screen insertion priority.

In an embodiment, the display screen 23 may comprise at least one restricted display screen location of the plurality of display screen locations, wherein the unoccupied display screen location does not overlap with the restricted display screen location of the plurality of display screen locations, and wherein the folder is inserted and displayed on the display screen without overlapping with the restricted display screen location of the plurality of display screen locations.

Figure 4A:
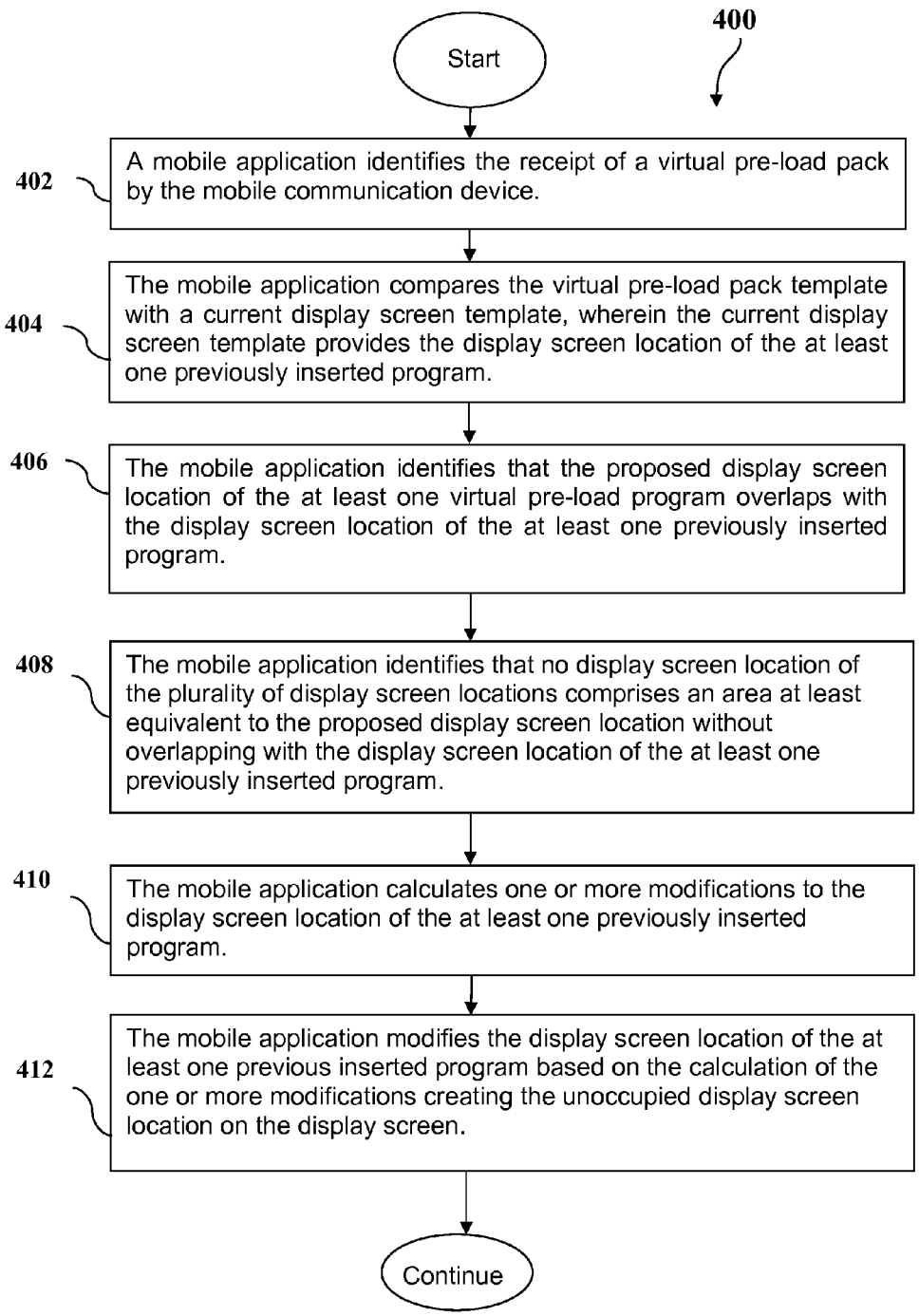
FIGS. 4A and 4B comprise a flow chart of a method according to an embodiment of the disclosure.
Figure 4B:
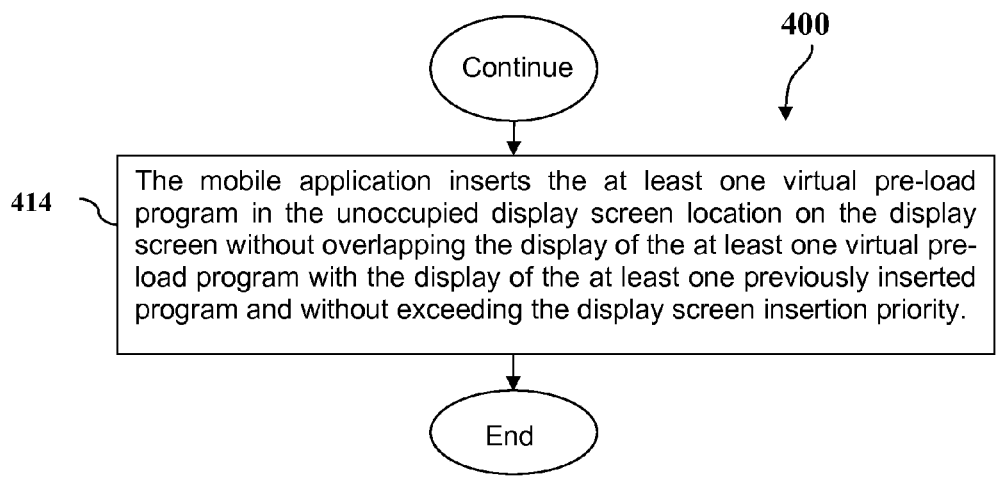

In FIGS. 4A and 4B, a method 400 is disclosed. At block 402, a mobile application 27 may identify the receipt of a virtual pre-load pack by the mobile communication device 12, wherein the virtual pre-load pack comprises at least one virtual pre-load program and a virtual pre-load pack template, wherein the virtual pre-load pack template provides a proposed display screen location of the plurality of display screen locations for the insertion of the at least one virtual pre-load program, wherein the proposed display screen location is based on a display screen insertion priority. In an embodiment, the display screen insertion priority may authorize a virtual pre-load program for insertion into a display screen location of the plurality of display screen locations comprising at most a predetermined level of viewing frequency.

At block 404, the mobile application 27 may compare the virtual pre-load pack template with a current display screen template, wherein the current display screen template provides the display screen location of the at least one previously inserted program. At block 406, the mobile application 27 may identify, based on the comparison of the virtual pre-load pack template with the current display screen template, that the proposed display screen location of the at least one virtual pre-load program overlaps with the display screen location of the at least one previously inserted program.

At block 408, the mobile application 27 may identify, based on the comparison of the virtual pre-load pack template with the current display screen template, that no display screen location of the plurality of display screen locations comprises an area at least equivalent to the proposed display screen location without overlapping with the display screen location of the at least one previously inserted program. At block 410, the mobile application 27 may calculate, in response to identifying that no display screen location of the plurality of display screen locations comprises an area at least equivalent to the proposed display screen location without overlapping with the display screen location of the at least one previously inserted program, one or more modifications to the display screen location of the at least one previously inserted program. The location of the at least one previously inserted program may be based on the comparison of the virtual pre-load pack template with the current display screen template so that an unoccupied display screen location comprising an area at least equivalent to the proposed display screen location is generated without overlapping with the display screen location of the at least one previously inserted program, wherein the unoccupied display screen location does not exceed the display screen insertion priority.

At block 412, the mobile application 27 may modify the display screen location of the at least one previous inserted program based on the calculation of the one or more modifications creating the unoccupied display screen location on the display screen. At block 414, the mobile application 27 may insert the at least one virtual pre-load program in the unoccupied display screen location on the display screen without overlapping the display of the at least one virtual pre-load program with the display of the at least one previously inserted program and without exceeding the display screen insertion priority.

In an embodiment, the display screen 23 may comprise at least one restricted display screen location of the plurality of display screen locations, wherein the unoccupied display screen location does not overlap with the restricted display screen location of the plurality of display screen locations, and wherein the at least one virtual pre-load program is inserted and displayed on the display screen without overlapping with the restricted display screen location of the plurality of display screen locations. In an embodiment, the method 400 may comprise that the one or more modifications comprises a minimum number of display screen location changes. In an embodiment, the one or more modifications may comprise detecting at least one previously inserted virtual pre-load program of the at least one previously inserted program and deleting the at least one previously inserted virtual pre-load program.

In an embodiment, the display screen 23 may comprise at least one display screen virtual page, wherein each of the at least one display screen virtual pages comprises at least one cell, and wherein a display screen location comprises at least one cell. In an embodiment, the one or more modifications may comprise moving the display screen location of the at least one previously inserted program from an initial display screen location to a subsequent display screen location so that at least one cell of the subsequent display screen location is adjacent to at least one cell of the initial display screen location. In an embodiment, the one or more modifications may comprise moving the display screen location of the at least one previously inserted program from an initial display screen location to a subsequent display screen location, wherein the initial display screen location and the subsequent display screen location are located on the same display screen virtual page.

Figure 5:
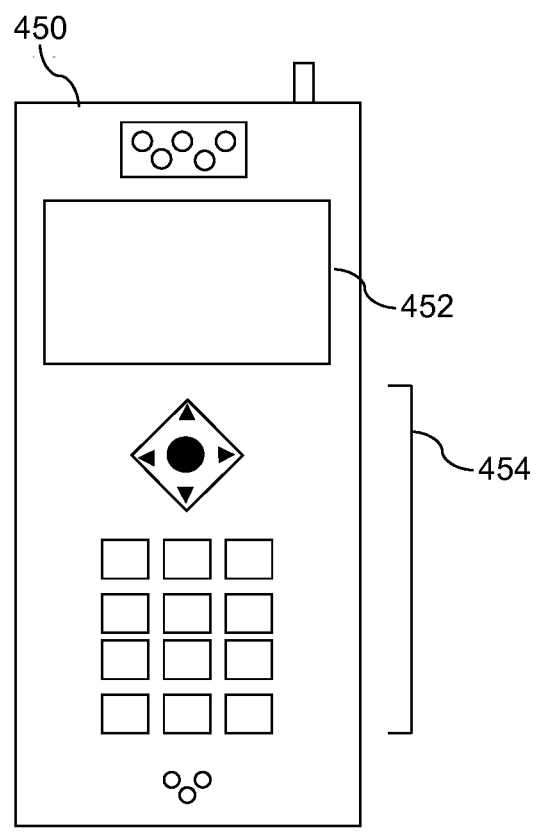
FIG. 5 is an illustration of a mobile device according to an embodiment of the disclosure.

FIG. 5 depicts the mobile device 450, which is operable for implementing aspects of the present disclosure, but the present disclosure should not be limited to these implementations. Though illustrated as a mobile phone, the mobile device 450 may take various forms including a wireless handset, a pager, a personal digital assistant (PDA), a gaming device, or a media player. The mobile device 450 includes a display 452 and a touch-sensitive surface and/or keys 454 for input by a user. The mobile device 450 may present options for the user to select, controls for the user to actuate, and/or cursors or other indicators for the user to direct. The mobile device 450 may further accept data entry from the user, including numbers to dial or various parameter values for configuring the operation of the handset. The mobile device 450 may further execute one or more software or firmware applications in response to user commands. These applications may configure the mobile device 450 to perform various customized functions in response to user interaction. Additionally, the mobile device 450 may be programmed and/or configured over-the-air, for example from a wireless base station, a wireless access point, or a peer mobile device 450. The mobile device 450 may execute a web browser application which enables the display 452 to show a web page. The web page may be obtained via wireless communications with a base transceiver station, a wireless network access node, a peer mobile device 450 or any other wireless communication network or system.

Figure 6:
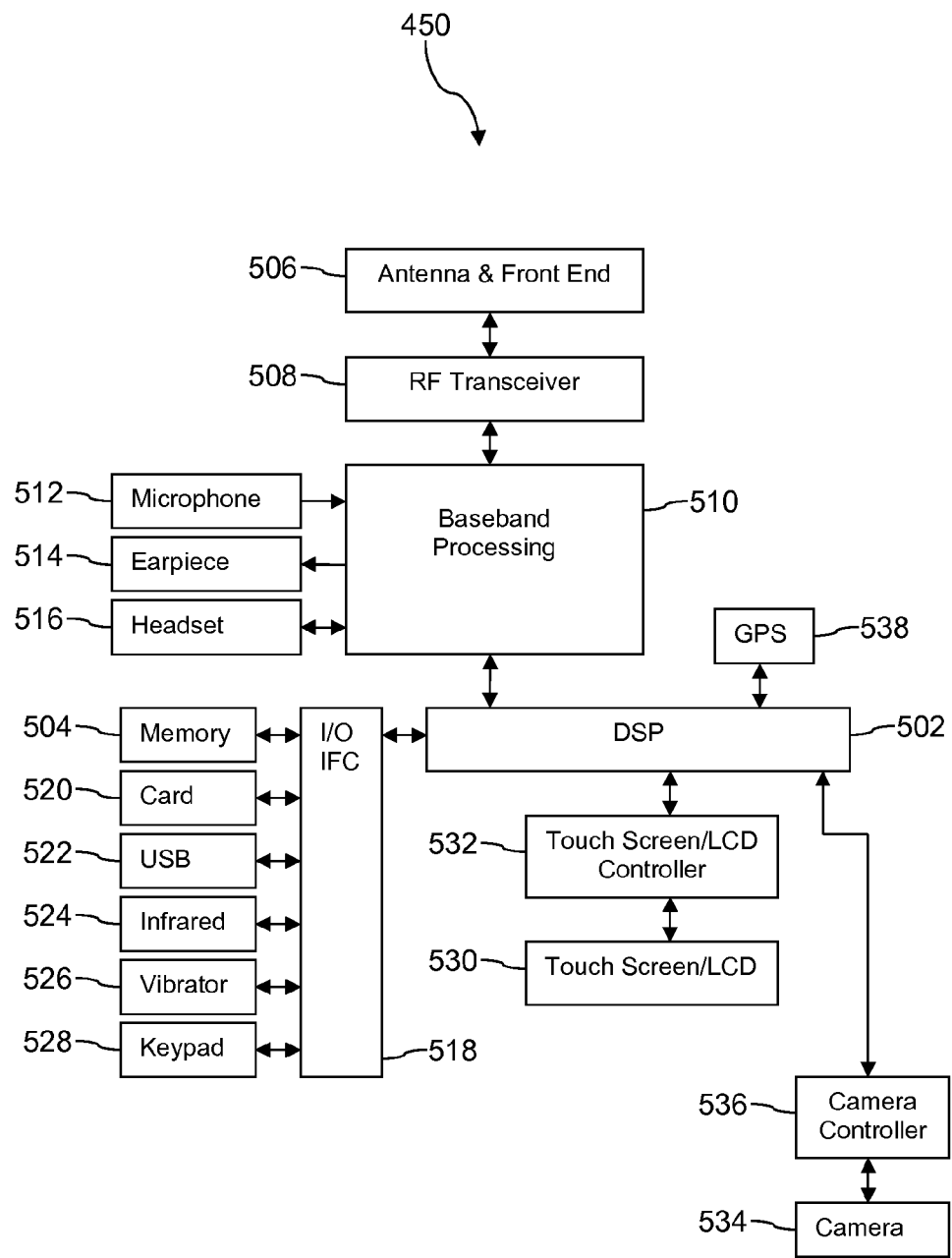
FIG. 6 is a block diagram of a mobile device according to an embodiment of the disclosure.

FIG. 6 shows a block diagram of the mobile device 450. While a variety of known components of handsets are depicted, in an embodiment a subset of the listed components and/or additional components not listed may be included in the mobile device 450. The mobile device 450 includes a digital signal processor (DSP) 502 and a memory 504. As shown, the mobile device 450 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 450 may include another kind of display that does not provide a touch sensitive screen. In an embodiment, the DSP 502 may communicate directly with the memory 504 without passing through the input/output interface 518. Additionally, in an embodiment, the mobile device 450 may comprise other peripheral devices that provide other functionality.

The DSP 502 or some other form of controller or central processing unit operates to control the various components of the mobile device 450 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 450 to function as a peripheral device to exchange information with a personal computer or other computer system. The infrared port 524 and other optional ports such as a Bluetooth® interface or an IEEE 802.11 compliant wireless interface may enable the mobile device 450 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 450. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 450 to determine its position.

Figure 7A:
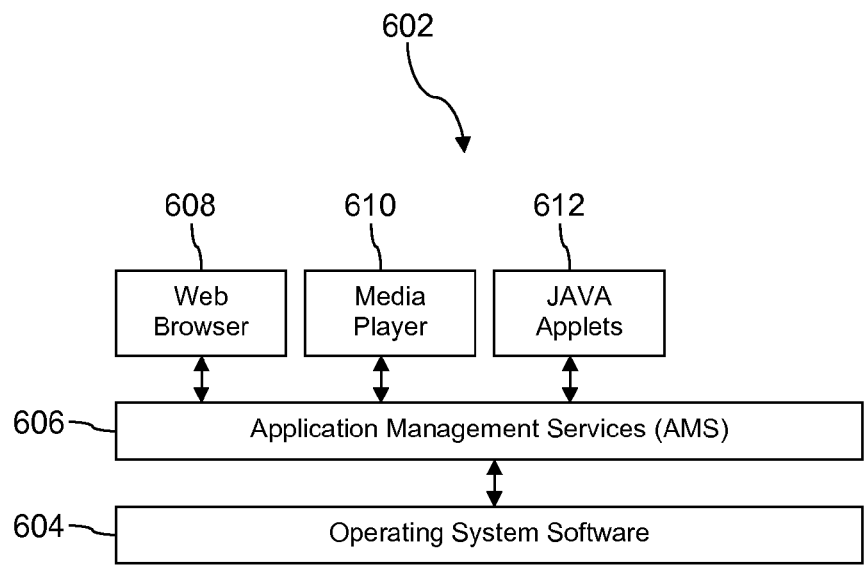
FIGS. 7A and 7B are block diagrams of software architecture for a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 450. Also shown in FIG. 7A are a web browser application 608, a media player application 610, and JAVA applets 612. The web browser application 608 may be executed by the mobile device 450 to browse content and/or the Internet, for example when the mobile device 450 is coupled to a network via a wireless link. The web browser application 608 may permit a user to enter information into forms and select links to retrieve and view web pages. The media player application 610 may be executed by the mobile device 450 to play audio or audiovisual media. The JAVA applets 612 may be executed by the mobile device 450 to provide a variety of functionality including games, utilities, and other functionality.

Figure 7B:
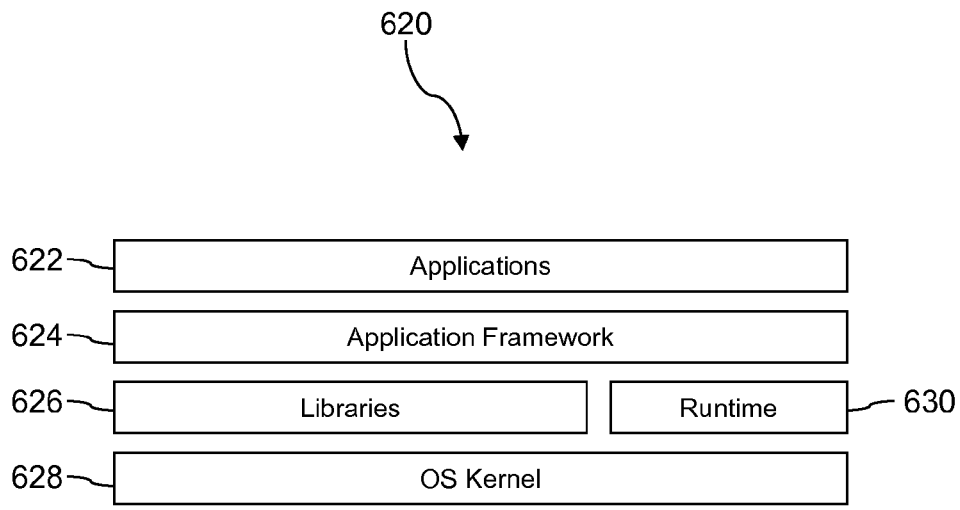

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
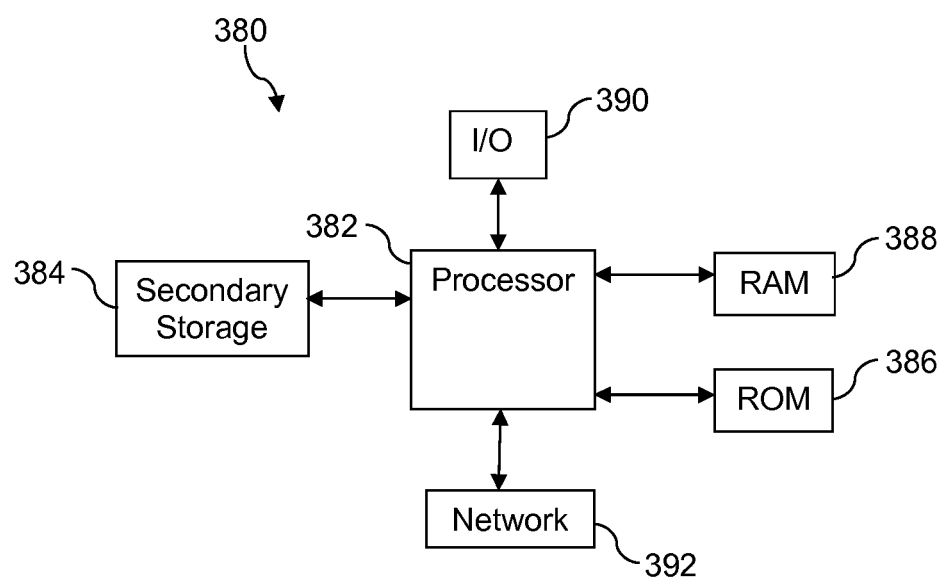
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for displaying non-disruptive additional content via a display screen, comprising:
   a mobile communication device comprising an application and the display screen, wherein the display screen displays at least one previously inserted program icon at a display screen location of a plurality of display screen locations; and
   the application, that when executed on the mobile communication device,
      identifies the receipt of a virtual pre-load pack by the mobile communication device, wherein the virtual pre-load pack comprises at least one virtual pre-load program icon and a virtual pre-load pack template that provides a proposed display screen location of the plurality of display screen locations for the insertion of the at least one virtual pre-load program icon, wherein the proposed display screen location is based on a display screen insertion priority level that authorizes the at least one virtual pre-load program icon for insertion into a display screen location of the plurality of display screen locations comprising at most a predetermined level of display frequency, and wherein the display frequency comprises the number of times that the display screen location is viewed;
      compares the virtual pre-load pack template with a current display screen template, wherein the current display screen template provides the display screen location of the at least one previously inserted program icon;
      identifies, based on the comparison of the virtual pre-load pack template with the current display screen template, that the proposed display screen location of the at least one virtual pre-load program icon overlaps with the display screen location of the at least one previously inserted program icon;

locates and selects, in response to identifying that the proposed display screen location of the at least one virtual pre-load program icon overlaps with the display screen location of the at least one previously inserted program icon, an unoccupied display screen location of the plurality of display screen locations for the insertion of the at least one virtual pre-load program icon based on the comparison of the virtual pre-load pack template with the current display screen template, wherein the unoccupied display screen location does not overlap with the display screen location of the at least one previously inserted program icon, and wherein the unoccupied display screen location does not violate the display screen insertion priority level; and inserts the at least one virtual pre-load program icon in the unoccupied display screen location on the display screen without overlapping the display of the at least one virtual pre-load program icon with the display of the at least one previously inserted program icon and without violating the display screen insertion priority level.

2. The system of claim 1, wherein the at least one virtual pre-load program icon comprises a virtual pre-load application icon, an application icon, a virtual widget, a widget, or a short-cut and the at least one previously inserted program icon comprises a virtual pre-load application icon, an application icon, a virtual widget, a widget, or a short-cut.

3. The system of claim 1, wherein the display screen comprises at least one restricted display screen location of the plurality of display screen locations, wherein the unoccupied display screen location does not overlap with the restricted display screen location of the plurality of display screen locations, and wherein the at least one virtual pre-load program icon is inserted and displayed on the display screen without overlapping with the restricted display screen location of the plurality of display screen locations.

4. The system of claim 1, wherein the predetermined level of display frequency is based on a viewing frequency of a display screen location of the plurality of display screen locations relative to a viewing frequency of a different display screen location of the plurality of display screen locations.

5. The system of claim 1, wherein the display screen comprises at least one display screen virtual page, wherein each of the at least one display screen virtual pages comprises at least one cell, and wherein a display screen location comprises at least one cell.

6. The system of claim 1, wherein the application, that when executed on the mobile communication device, locates and selects, in response to identifying that the proposed display screen location of the at least one virtual pre-load program icon overlaps with the display screen location of the at least one previously inserted program icon, at least two unoccupied display screen locations of the plurality of display screen locations for the insertion of the at least one virtual pre-load program icon based on the comparison of the virtual pre-load pack template with the current display screen template;

displays a notification on the display screen prompting a user to provide a user selection of one unoccupied display screen location of the at least two unoccupied display screen locations;

receives the user selection of the one unoccupied display screen location of the at least two unoccupied display screen locations; and inserts the at least one virtual pre-load program icon in the one unoccupied display screen location, wherein the one unoccupied display screen location is based on the received user selection.

7. The system of claim 1, wherein the unoccupied display screen location comprises different dimensions but the same area as the proposed display screen location so that when the at least one virtual pre-load program icon is inserted and displayed in the unoccupied display screen location on the display screen, the at least one virtual pre-load program icon comprises the same dimensions as the unoccupied display screen location.

8. The system of claim 1, wherein the application provides a notification that the at least one virtual pre-load program icon is displayed on the display screen.

9. The system of claim 1, wherein the unoccupied display screen location comprises a designated display screen location for virtual pre-load program icons.

10. A system for displaying non-disruptive additional content via a display screen, comprising:

a mobile communication device comprising an application and the display screen, wherein the display screen displays at least one previously inserted program icon at a display screen location of a plurality of display screen locations; and the application, that when executed on the mobile communication device, identifies the receipt of a virtual pre-load pack by the mobile communication device, wherein the virtual pre-load pack comprises at least one virtual pre-load program icon and a virtual pre-load pack template that provides a proposed display screen location of the plurality of display screen locations for the insertion of the at least one virtual pre-load program icon, wherein the proposed display screen location is based on a display screen insertion priority level that authorizes the at least one virtual pre-load program icon for insertion into a display screen location of the plurality of display screen locations comprising at most a predetermined level of display frequency, and wherein the display frequency comprises the number of times that the display screen location is viewed;

compares the virtual pre-load pack template with a current display screen template, wherein the current display screen template provides the display screen location of the at least one previously inserted program icon;

identifies, based on the comparison of the virtual pre-load pack template with the current display screen template, that the proposed display screen location of the at least one virtual pre-load program icon overlaps with the display screen location of the at least one previously inserted program icon;

identifies, based on the comparison of the virtual pre-load pack template with the current display screen template, that no display screen location of the plurality of display screen locations comprises an area at least equivalent to the proposed display screen location without overlapping with the display screen location of the at least one previously inserted program icon;

locates and selects an unoccupied display screen location of the plurality of display screen locations for the insertion of the at least one virtual pre-load program icon based on the comparison of the virtual pre-load pack template with the current display screen template, wherein the unoccupied display screen location comprises an area less than the area of the proposed display screen location, wherein the unoccupied display screen location does not overlap with the display screen location of the at least one previously inserted program icon, and wherein the unoccupied display screen location does not exceed the display screen insertion priority level;

generates, based on selecting the unoccupied display screen location, a folder configured to store the at least one virtual pre-load program icon and configured to fit within the area of the unoccupied display screen location;

stores the at least one virtual pre-load program icon in the folder; and inserts the folder in the unoccupied display screen location on the display screen without overlapping the display of the folder with the display of the at least one previously inserted program icon and without violating the display screen insertion priority level.

11. The system of claim 10, wherein the folder maintains a view of each of the at least one virtual pre-load program icon on the display screen up to a predetermined quantity of the at least one virtual pre-load program icons stored in the folder.

12. The system of claim 11, wherein when a quantity of the at least one virtual pre-load program icon in the folder exceeds the predetermined quantity, and wherein when the predetermined quantity is greater than one, the application:

removes at least one excess virtual pre-load program icon of the at least one virtual pre-load program icon stored in the folder so that the quantity of the at least one virtual pre-load program icon in the folder does not exceed the predetermined quantity;

locates and selects another unoccupied display screen location of the plurality of display screen locations for the insertion of the at least one excess virtual pre-load program icon based on the comparison of the virtual pre-load pack template with the current display screen template, wherein the other unoccupied display screen location does not overlap with the display screen location of the at least one previously inserted program icon and the folder, and wherein the other unoccupied display screen location does not violate the display screen insertion priority level; and inserts the at least one excess virtual pre-load program icon in the other unoccupied display screen location on the display screen without overlapping the display of the at least one virtual pre-load program icon with the display of the at least previously inserted program icon as well as the display of the folder and without violating the display screen insertion priority level.

13. The system of claim 10, wherein the display screen comprises at least one restricted display screen location of the plurality of display screen locations, wherein the unoccupied display screen location does not overlap with the restricted display screen location of the plurality of display screen locations, and wherein the folder is inserted and displayed on the display screen without overlapping with the restricted display screen location of the plurality of display screen locations.

14. A system for displaying non-disruptive additional content via a display screen, comprising:

a mobile communication device comprising an application and the display screen, wherein the display screen displays at least one previously inserted program icon at a display screen location of a plurality of display screen locations; and the application, that when executed on the mobile communication device, identifies the receipt of a virtual pre-load pack by the mobile communication device, wherein the virtual pre-load pack comprises at least one virtual pre-load program icon and a virtual pre-load pack template that provides a proposed display screen location of the plurality of display screen locations for the insertion of the at least one virtual pre-load program icon, wherein the proposed display screen location is based on a display screen insertion priority level that authorizes the at least one virtual pre-load program icon for insertion into a display screen location of the plurality of display screen locations comprising at most a predetermined level of display frequency, and wherein the display frequency comprises the number of times that the display screen location is viewed;

compares the virtual pre-load pack template with a current display screen template, wherein the current display screen template provides the display screen location of the at least one previously inserted program icon;

identifies, based on the comparison of the virtual pre-load pack template with the current display screen template, that the proposed display screen location of the at least one virtual pre-load program icon overlaps with the display screen location of the at least one previously inserted program icon;

identifies, based on the comparison of the virtual pre-load pack template with the current display screen template, that no display screen location of the plurality of display screen locations comprises an area at least equivalent to the proposed display screen location without overlapping with the display screen location of the at least one previously inserted program icon;

calculates, in response to identifying that no display screen location of the plurality of display screen locations comprises an area at least equivalent to the proposed display screen location without overlapping with the display screen location of the at least one previously inserted program icon, one or more modifications to the display screen location of the at least one previously inserted program icon based on the comparison of the virtual pre-load pack template with the current display screen template so that an unoccupied display screen location comprising an area at least equivalent to the proposed display screen location is generated without overlapping with the display screen location of the at least one previously inserted program icon, wherein the unoccupied display screen location does not violate the display screen insertion priority level;

modifies the display screen location of the at least one previously inserted program icon based on the calculation of the one or more modifications creating the unoccupied display screen location on the display screen; and inserts the at least one virtual pre-load program icon in the unoccupied display screen location on the display screen without overlapping the display of the at least one virtual pre-load program icon with the display of the at least one previously inserted program icon and without violating the display screen insertion priority level.

15. The system of claim 14, wherein the display screen comprises at least one restricted display screen location of the plurality of display screen locations, wherein the unoccupied display screen location does not overlap with the restricted display screen location of the plurality of display screen locations, and wherein the at least one virtual pre-load program icon is inserted and displayed on the display screen without overlapping with the restricted display screen location of the plurality of display screen locations.

16. The system of claim 14, wherein the one or more modifications comprises a minimum number of display screen location changes.

17. The system of claim 14, wherein the one or more modifications comprises detecting at least one previously inserted virtual pre-load program icon of the at least one previously inserted program icon and deleting the at least one previously inserted virtual pre-load program icon from the display.

18. The system of claim 14, wherein the display screen comprises at least one display screen virtual page, wherein each of the at least one display screen virtual pages comprises at least one cell, and wherein a display screen location comprises at least one cell.

19. The system of claim 18, wherein the one or more modifications comprises moving the display screen location of the at least one previously inserted program icon from an initial display screen location to a subsequent display screen location so that at least one cell of the subsequent display screen location is adjacent to at least one cell of the initial display screen location.

20. The system of claim 18, wherein the one or more modifications comprises moving the display screen location of the at least one previously inserted program icon from an initial display screen location to a subsequent display screen location, wherein the initial display screen location and the subsequent display screen location are located on the same display screen virtual page.

* * * * *